(12) United States Patent
Barr et al.

(10) Patent No.: US 6,189,100 B1
(45) Date of Patent: Feb. 13, 2001

(54) ENSURING THE INTEGRITY OF REMOTE BOOT CLIENT DATA

(75) Inventors: Adam D. Barr, Redmond; Michael M. Swift, Seattle; Charles T. Lenzmeier, Woodinville, all of WA (US)

(73) Assignee: Microsoft Corporation, Redmond, WA (US)

(*) Notice: Under 35 U.S.C. 154(b), the term of this patent shall be extended for 0 days.

(21) Appl. No.: 09/107,007

(22) Filed: Jun. 30, 1998

(51) Int. Cl.[7] .................................................. G06F 1/24
(52) U.S. Cl. ..................... 713/182; 713/150; 713/168; 713/200; 380/255; 380/270; 380/278
(58) Field of Search ..................... 380/255, 270, 380/278, 283; 713/150, 161, 168, 171, 184, 200, 201, 182

(56) References Cited

U.S. PATENT DOCUMENTS 4,993,068 * 2/1991 Piosenka et al. ...................... 380/23
5,235,642 * 8/1993 Wobber et al. ........................ 380/25
5,560,008 * 9/1996 Johnson et al. ...................... 709/300
5,999,711 * 12/1999 Misra et al. ...................... 395/187.01

* cited by examiner

Primary Examiner—Thomas R. Peeso
(74) Attorney, Agent, or Firm—Schwegman, Lundberg, Woessner & Kluth, P.A.

(57) ABSTRACT

A remote boot process uses a secret to sign and/or seal the data necessary to remotely boot a client from a server on a network to ensure the integrity of the data. The secret is generated by the server and securely delivered to the client during the initial setup of the client. The secret contains a one-way encryption of the password for the client account on the server. Each side balances a signed message with a verify and a sealed message with an unseal. Subsequent transactions between the client and server are conducted using messages encrypted with a key generated by the server and securely delivered to the client in a message sealed using the secret. The secret can also be used in conjunction with an access data structure to prevent unauthorized users from accessing data stored on the server on behalf of the client or other users. In other aspects of the invention, the secret is replaced by a client private/public key pair.

27 Claims, 17 Drawing Sheets

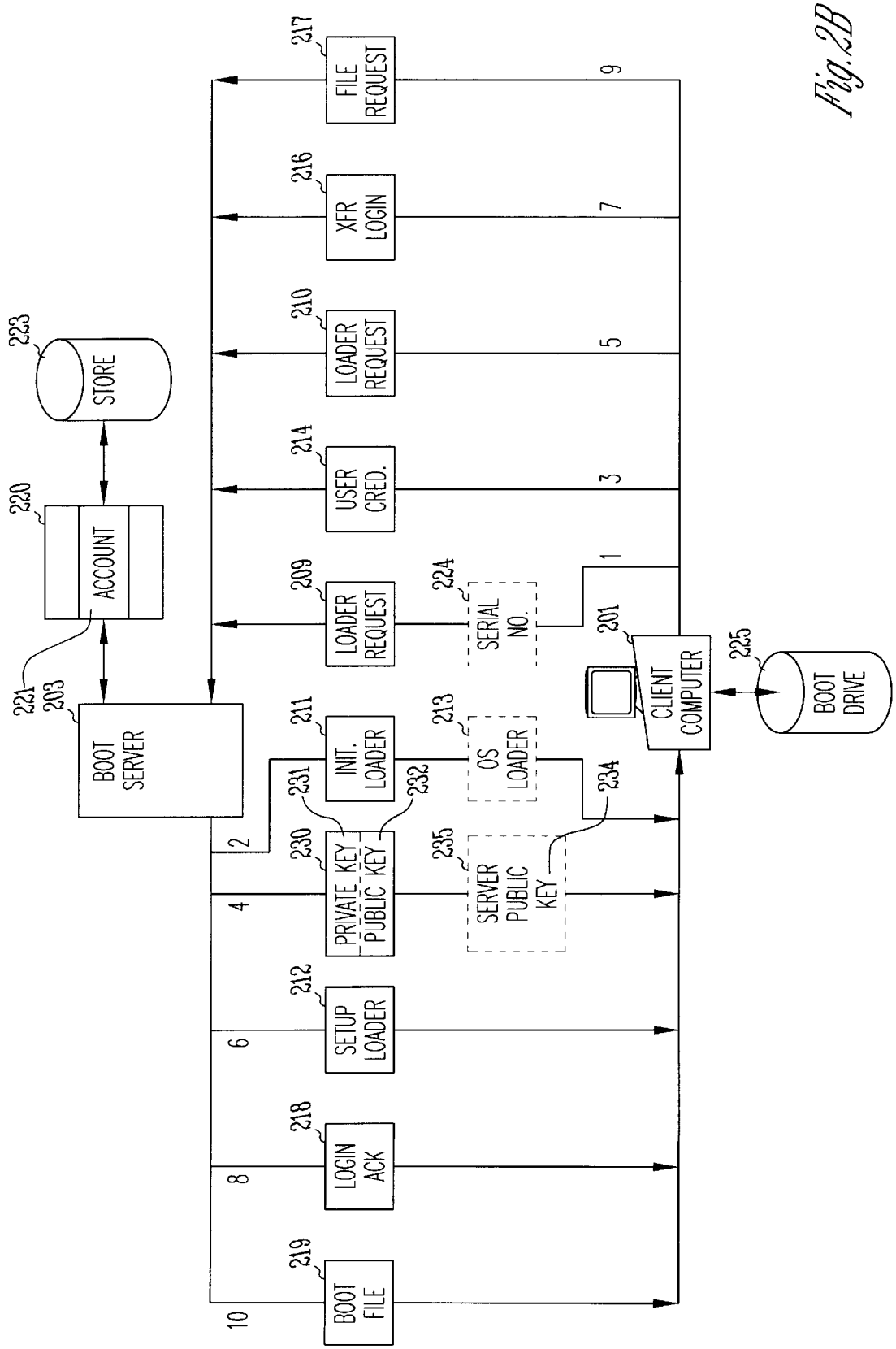

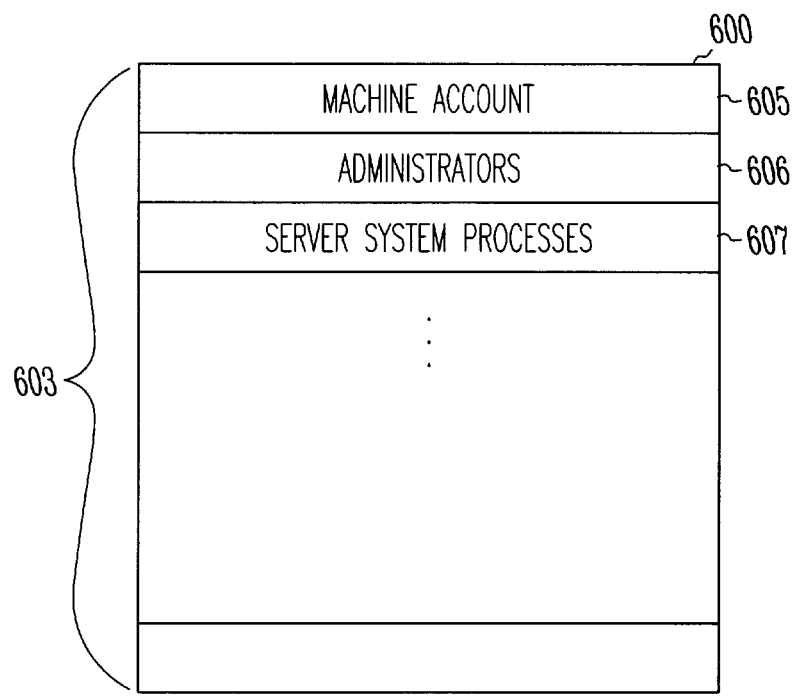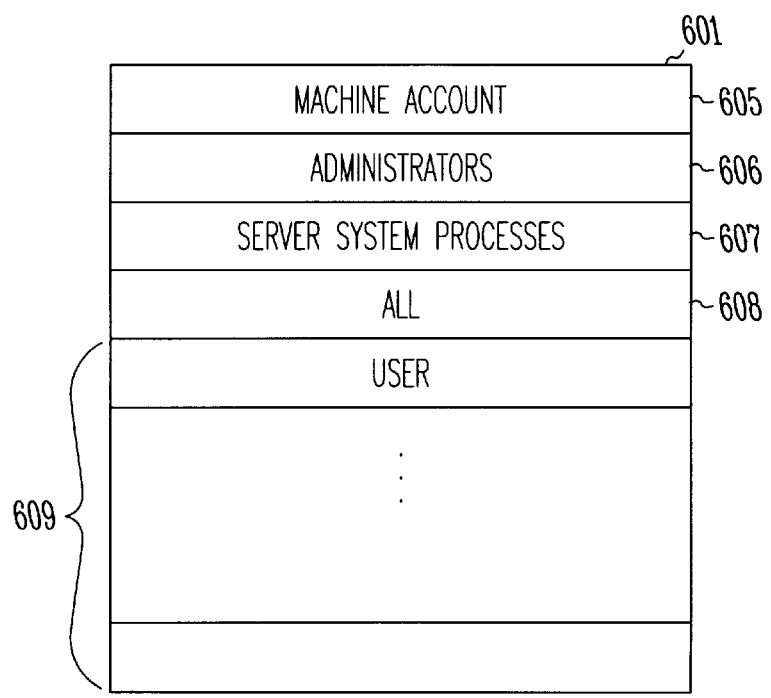
Fig. 6

ENSURING THE INTEGRITY OF REMOTE BOOT CLIENT DATA

FIELD OF THE INVENTION

This invention relates generally to networked computers, and more particularly to booting a computer across a network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1997, Microsoft Corporation, All Rights Reserved.

BACKGROUND OF THE INVENTION

A remote boot client computer boots off a server computer connected to the client through a network rather than booting from the local boot drive. Everything that would normally be stored on the local boot drive is instead stored in a client-specific location, or store, on the server. When a remote boot client computer starts up, typically the boot ROM (read-only memory) in the client requests a small bootstrap code module known as a "loader" from the server which the server transfers over the network to the client. The loader executes on the client computer and causes the server to transfer the operating system executable and other files needed to start the system. The operation system executable and other files are collectively referred to as the "boot files." Once the operating system is up and running on the client, it communicates over the network as needed to read and write other files from and to the client-specific store that it would normally read and write from and to the client computer's hard drive if booting locally.

Because the data used to boot the client is stored is on the server, it important that the data be as secure as the data would be if it were stored on the local boot drive. This means that it must be protected from viewing and modification by unwanted users, both while it resides on the server and while it is being transferred across the network. Typically, the network protocol used to transfer the loader and the boot files to the client computer is a simple protocol, such as TFTP (trivial file transport protocol), which does not provide security services. A simple, unsecured protocol generally means that any boot file that the loader downloads from the server for one remote client computer will be easily readable by any other client computer on the network. Thus, current remote boot operations present major security issues.

The lack of security in the transfer protocol makes it is easy for a rogue user with access to the network to capture the loader and/or boot files as they are being downloaded from the server to the client. The rogue user can then modify and re-send the modified files to the client. Such an operation is known as "spoofing." A client machine that has been spoofed is unaware that the loader and/or boot files are not coming from the legitimate boot server. At best, the rogue user inserts invalid bits into the loader and/or boot files that prevent them from loading. At worse, the rogue user can cause the loader or boot files to operate in a manner other than what was intended. For example, the loader could be modified to ask the user for a password, and then rebroadcast the password on the network without the user's knowledge. Additionally, the boot files themselves can contain password data or other sensitive material which can be captured by the rogue user.

Another issue with remote booting is that a rogue user can set up a computer to pretend to be either the client or server by observing the network traffic between client and server when they boot. On the client side, the rogue user programs a rogue computer to imitate the legitimate client when booting. The server is unaware that it is not communicating with the legitimate client computer and the server gives the rogue computer access to the legitimate client computer's client-specific store. Furthermore in this case, the server would also give the rogue computer access to any other files on the server that the legitimate client has permission to view. On the server side, the rogue user programs the rogue computer to imitate the legitimate server. The rogue server then sends down modified binaries to a legitimate client. Such modified binaries can, for example, request the user's password and store the entered password for later use.

Once the client computer is booted up, more sophisticated protocols are available to ensure integrity and encryption of files passed between the client and the server. One example is the IP (internet) security protocol known as "ipsec." However ipsec requires that the client and server exchange an encryption key between the two computers. If the encryption key itself is sent over an unsecured network, the security of ipsec is compromised.

Therefore, there is a need to secure the remote boot process which also provides a mechanism for a client and server to exchange a shared encryption key using the secure remote boot process.

SUMMARY OF THE INVENTION

The above-mentioned shortcomings, disadvantages and problems are addressed by the present invention, which will be understood by reading and studying the following specification.

A remote boot process uses a secret shared between a client and a server to sign and/or seal the data necessary to remotely boot the client from the server on a network to ensure the integrity of the data. The secret is generated by the server and securely delivered to the client during the initial setup of the client. The secret contains a one-way encryption of the password for the client account on the server. Each side balances a signed message with a verify and a sealed message with an unseal. After the boot process is complete, subsequent transactions between the client and server are conducted using messages encrypted with a key generated by the server and securely delivered to the client in a message sealed using the secret. The secret can also be used in conjunction with an access data structure to prevent unauthorized users from accessing data stored on the server on behalf of the client or other users using an access control data structure. The use of private/public key pair for the client to replace the secret is also described.

In one aspect of the invention, three loaders, a secured file transport service and secure conversation that couples the client and the server interface to provide the benefits of securing the remote boot data when boot across the network. In another aspect of the invention, the initial setup of the client is performed across the network, but subsequent boots are performed from boot files downloaded from the server and stored on the client's local boot drive.

Because the remote boot process secures the boot data using a simple balanced sign/verify and seal/unseal protocol, it is suitable for use with a loader having minimal available processing capabilities and thus can be used throughout the boot process to seal (or sign) the data exchanged between the client and the server so that a rogue user has little opportunity to corrupt the process. Furthermore, the secret can be used to set up more sophisticated security protocols used after the boot process is completed. Finally, because the secret is tied to the client's account on the server, the server can secure client data stored on the server from unwanted access.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 2B is a diagram illustrating a system-level overview of an alternate exemplary embodiment of the invention;

FIG. 6 is a diagram of access control list data structures for use in an exemplary implementation of the invention;

FIGS. 7A, 7B, 7C, 7D, 7E, 7F, 7G, 7H and 7I are diagrams of message flows in an exemplary embodiment of the invention;

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of several embodiments of invention is presented in three sub-sections. In the third section, methods for an exemplary embodiment of the invention are provided. In the fourth section, a particular implementation of the invention in a Microsoft Windows NT 5.0 environment is described. Finally, in the fifth section, a conclusion of the detailed description is provided.

Hardware and Operating Environment

Figure 1:
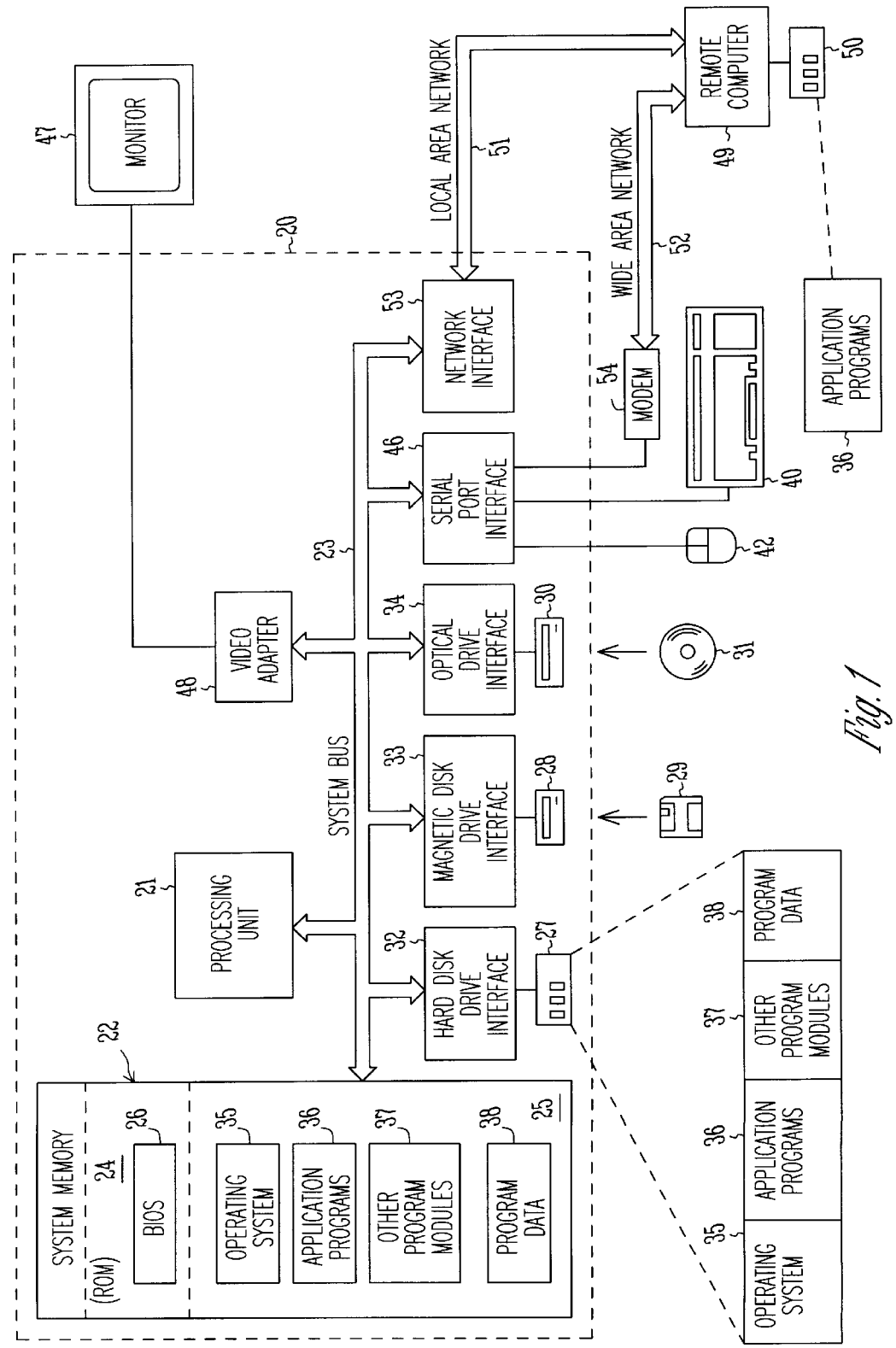
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

A system level overview of the operation of exemplary embodiments of the invention is described by reference to FIGS. 2A through 7I which illustrate messages and files passed between a remote boot client computer, such as computer 20 (FIG. 1), and a boot server computer, such as computer 49 (FIG. 1), to provide a secure remote boot process across a network, such as local area network 51 or wide area network 52 in FIG. 1. The secure remote boot process ensures the integrity of loader applications and boot files downloaded by the boot server to the client computer.

A loader application requires only the services provided by the computer's BIOS without needing support from higher software layers such as found in standard operating systems. The BIOS services required for remote booting include the ability to send and receive messages and files over the network using a network communications protocol. In the exemplary embodiments shown in FIGS. 2–7I, the messages and files are embedded in packets and sent over the network using any of the commonly-used transport protocols.

The secured remote boot process of the present invention relies on one of the commonly-available standard security services which provides secured logons, balanced signing and sealing operations, and has a client module small enough to be incorporated into a loader application. The secured logon operation validates the client computer to the boot server, i.e. prove that the client computer is legitimate, as explained in detail below. The signing operation permits either side to attach a digital signature to a message, which keeps the message readable by anyone, but allows the recipient to verify if the message has been modified. The sealing operation permits either side to encrypt the message so that no one but the recipient can read the message. Balanced signing and sealing operations requires that the two sides respond to every signing operation with a corresponding verify operation, and every sealing operation with a corresponding unsealing operation. Kerberos is one example of a security service suitable for use with the present invention and is available from CyberSafe in Issaquah, Wash.

As will be readily apparent to one skilled in the art, the requirement that signing and sealing operations be equally balanced with verifying and unsealing operations provides the most security. However, remote boot data can also be protected through signing and sealing operations which are not balanced, and the scope of the invention is intended to cover such embodiments as well.

Secured Remote Boot Process

Figure 2A:
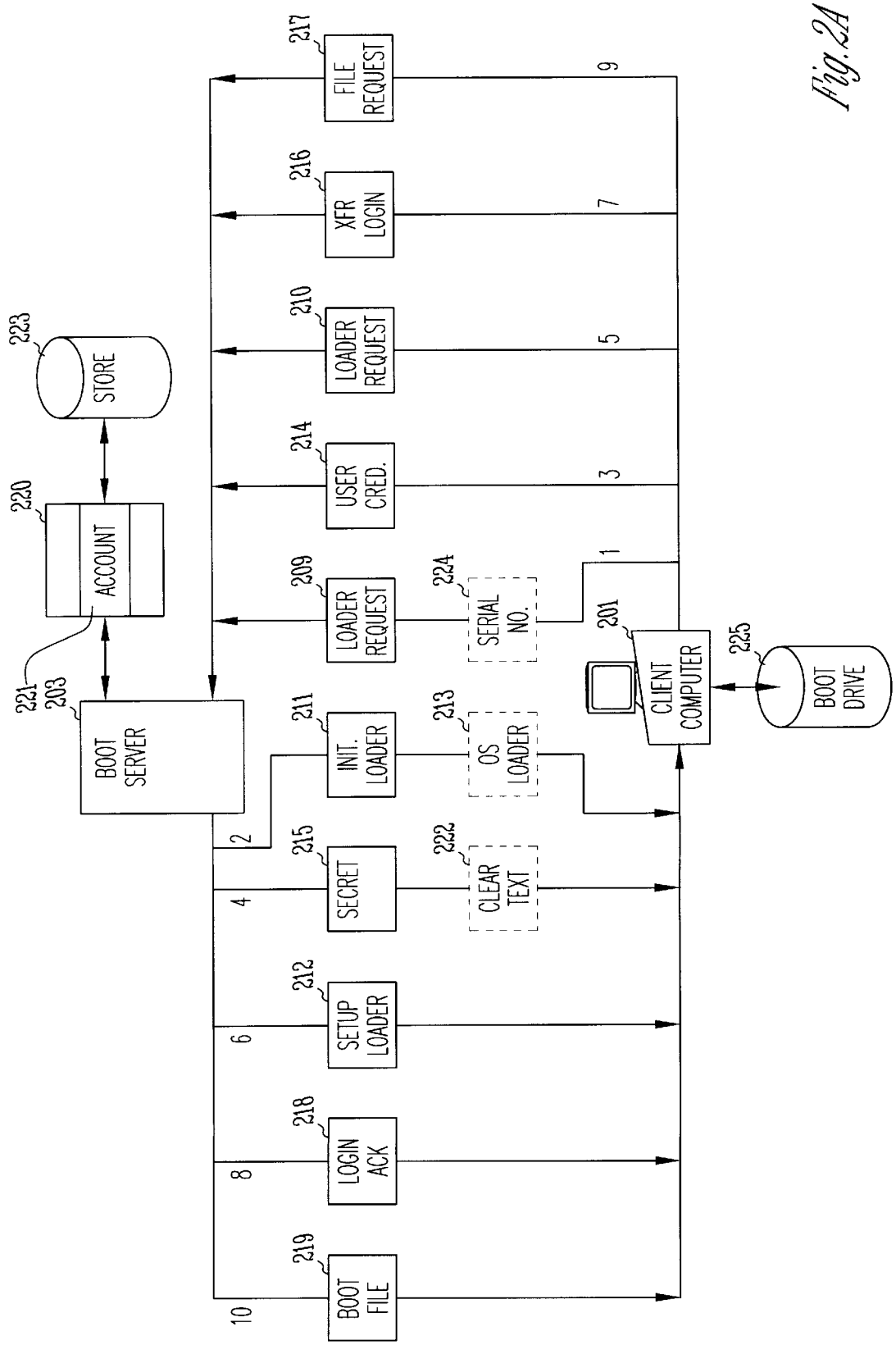
FIG. 2A is a diagram illustrating a system-level overview of an exemplary embodiment of the invention.

FIG. 2A shows an exemplary embodiment of the messages and files required to initially setup a client computer 201 to securely boot from a boot server 203. The secure boot process uses a "secret" shared between the client computer 201 and the boot server 203 to ensure the integrity of the data exchanged. A network identifier for the client computer 201 is stored in the BIOS firmware of the client computer 201. When the client computer 203 is powered up, the firmware broadcasts the network identifier to request 209 a loader application from a boot server (transaction 1). The boot server 203 recognizes the network identifier as belonging to a client for which it is responsible. Alternatively, the boot server 203 can be setup to act as the default boot server for new clients. Because this is the initial setup, the boot server 203 downloads an initialization loader 211 (transaction 2) which is executed on the client computer 201 by the firmware.

The initialization loader 211 requests that the user of the client computer 201 input credentials, such as a name and/or password, and presents the user credentials 214 to the boot server 203 to authenticate the legitimacy of the client (transaction 3). The boot server 203 creates a machine account 221 for the client computer 201 in a directory service structure 220. A machine account is specific to a particular client computer and should be distinguished from a user account of any user that logs into the network through the client computer. The machine account 221 is associated with a client-specific storage location 223, or store, on the boot server 203.

The boot server 203 generates a password for the machine account, uses a one-way encryption algorithm and the machine account name to encrypt the password, creating the secret 215. In an alternate embodiment, the secret 215 contains additional information, such as the machine account name and the domain of the client, in addition to the encrypted password. The boot server then uses the user credentials to seal the message holding the secret 215 and downloads the sealed message to the client computer 201 (transaction 4). The client computer 201 unseals the message and stores the secret 215 in a secure location on its boot drive 225. The client computer 201 sends a loader request 210 to the boot server 203 (transaction 5).

The boot server 203 transfers a setup loader 212 to the client computer 201 (transaction 6). The setup loader 212 converses with the security service on the boot server 203 to log into a file transfer service on the boot server 203 using the machine account name and the secret 215 (transaction 7) as described in more detail below. When acknowledgement 218 that the login has been authenticated is received (transaction 8), the setup loader 212 issues read requests 217 to download the boot files 219 necessary to complete the boot process (transaction 9). Each read request 217 is signed using the secret 215.

The boot server 203 seals the requested boot files 219 and downloads them to the client computer 201 (transaction 10). One of the boot files 219 is the operating system kernel which is initiated by the setup loader 212 to complete the boot process.

On subsequent remote boots when the BIOS firmware requests a loader application in transaction 1, the boot server 203 transfers an OS (operating system) loader 213 instead of the initialization loader 211 as shown in phantom in FIG. 2A. The OS loader picks up the boot process at transaction 7 (transactions 2–6 are unnecessary on subsequent boots) and performs the functions initially executed by the setup loader 212.

Because the machine account password is encrypted using a one-way encryption algorithm to create the secret 215, the password cannot be recreated from the secret 215. This prevents an unauthorized user from "hacking" the password from the secret 215 stored on the boot drive 223. When it is necessary for the client computer 201 to transfer files to and from the boot server 203, the operating system kernel retrieves the secret 215 from its secure location on the boot drive 225 and logs onto the machine account 221 using the machine account name and secret 215. However, other portions of the operating system need to use a clear-text version of the machine account password for various operations.

In an alternate embodiment of transaction 3 shown in phantom in FIG. 2A, the boot server 203 includes a clear-text version 222 of the password 216 in the secret 215. The OS loader 213 reads the secret 215 from its secure location on the boot drive and passes the secret 215 to a local security module in the operating system when the module is initiated at the completion of the boot process. The local security module is responsible for controlling the use of the clear-text version of the password. Once the secret 215 has been given to the local security module, the OS loader 213 can delete the clear-text version 222 of the password from the secret 215.

Because only the client computer 201 and the boot server 203 share the secret 215, signing a message or file using the secret 215 ensures that the signing computer is legitimate since a rogue computer would not have the secret. Additionally, signing the read request by the client computer 201 ensures that a rogue computer on the network cannot modify the name of the file that was requested because modifying the file also modifies the secret.

Having the boot server 203 seal the boot files 219 before downloading them provides two benefits. First, a rogue user cannot read or modify these files. Second, the fact that the client computer 201 can unseal messages and files which were sealed by the boot server 203 proves the legitimacy of the server since rogue server would not have the secret 215. An alternate embodiment in which the boot files 219 are signed but not sealed by the boot server 203 provides a lesser level of security but is also contemplated as within the scope of the invention.

In the exemplary embodiment shown in FIG. 2A, the secret 215 is generated on the boot server 203 because the boot server 203 is fully operational, as opposed to the initialization loader 211, and because the boot server 203 is responsible for setting up the machine account. Alternate embodiments in which the client computer 201 generates the secret 215 (or the information necessary for the boot server to generate the secret) and uploads it to the boot server 203 in a sealed message will be readily apparent to one skilled in the art and are contemplated as within the scope of the invention. A further alternate embodiment encompasses the boot server 203 downloading the clear text password in a sealed message and having the client computer 201 create the secret 215 from the clear text password.

Furthermore, although the client computer 201 has been described as having a boot drive, one of skill in the art will appreciate that any type of non-volatile computer readable storage media, such as NVRAM or an insertable smart card, can be used to hold the secret.

An additional alternate embodiment in which no non-volatile storage is associated with the client computer 201 is also contemplated. In such an alternate embodiment, the user's credentials sent to the boot server 203 in transaction 3 are used as the secret. The secret is secured in the client computer's volatile memory for the life of the session.

FIG. 2B shows an alternate exemplary embodiment of the messages and files required to initially setup a client computer 201 to securely boot from a boot server 203 using a public/private key pair for the client computer 201. A message encrypted with the public key can only be decrypted with the corresponding private key and a message encrypted with the private key can only be decrypted with the corresponding public key. Therefore, if the client computer 201 creates a digital signature using its private key and signs a message with the digital signature, and the boot server 203 verifies the signature with the corresponding public key, the message is authenticated as having originated with the client computer 201. In this case, the message itself remains readable. Alternatively, if a message is sealed using the client's public key only the client computer 201 can unseal the message using the private key and read the contents.

Transactions 1 through 3 proceed as described above in conjunction with FIG. 2A. In transaction 4, the boot server 203 also creates a machine account and password for the client computer 201, but instead of creating a secret by encrypting the password, the boot server 203 creates a private key 231/public key 232 pair for the client computer 201 which it downloads along with the machine account password to the client computer 201 in a message 230 sealed with the user credentials. The client computer 201 unseals the message and stores its key pair 231, 232 in a secure location on its boot drive 225. On the server side, the client's public key 232 is managed by the security service described above. The client computer 201 requests a loader (transaction 5).

The boot server 203 transfers the setup loader 212 to the client computer 201 (transaction 6) which converses with the security service on the boot server 203 to log into a file transfer service on the boot server 203 using the machine account name and password (transaction 7). When the login acknowledgement is received (transaction 8), the setup loader 212 issues read requests 217 to download the boot files 219 necessary to complete the boot process (transaction 9). Each read request 217 is signed with the client's private key 231.

The boot server 203 seals the requested boot files 219 with the client's public key 232 and downloads them to the client computer 201 (transaction 10).

An alternate embodiment in which the boot server 203 also has a private key 233/public key 234 pair is shown in phantom in FIG. 2A. The boot server 203 downloads its public key 234 to the client computer 201 in transaction 4. The boot server 203 signs messages, such as those containing boot files, with its private key 233 to prove their authenticity to the client computer 201. The client computer 201 seals messages using the boot server's public key 234 to secure the contents from everyone other than the boot server 233. If the boot server 203 seals messages with the client's public key 232 and then signs the sealed message with its private key 234, the message is both validated and secure.

Additional alternate embodiments in which the public key 234 is delivered to the client computer 201 in a later transaction and in which a security certificate instead of the boot server's public key 234 is delivered to the client computer 201 will be readily apparent to one of skill in the art.

In the exemplary embodiment shown in FIG. 2B, the private key 231/public key 232 pair is generated on the boot server 203 because the boot server 203 is fully operational but alternate embodiments in which the client computer 201 generates the key pair and uploads its public key 232 to the boot server 203 will be immediately perceived as within the scope of the invention.

As discussed above in conjunction with FIG. 2A, the client computer 201 can also store its key pair on any type of non-volatile computer readable storage media so the invention is not limited to practice only with client computers having hard drives.

Figure 3:
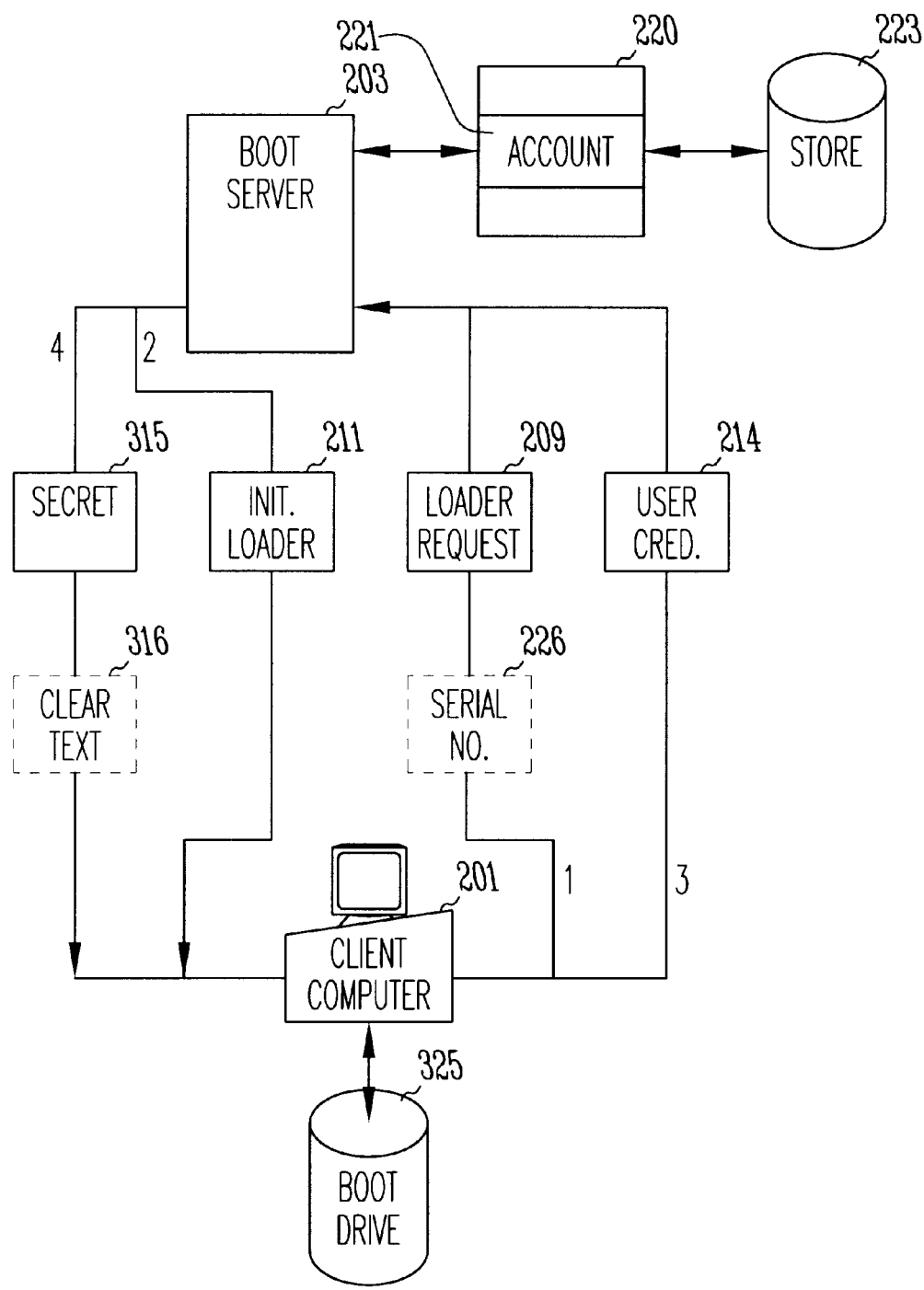
FIGS. 3 and 4 are diagrams illustrating a system-level overview of an alternate embodiment of the invention.
Figure 4:
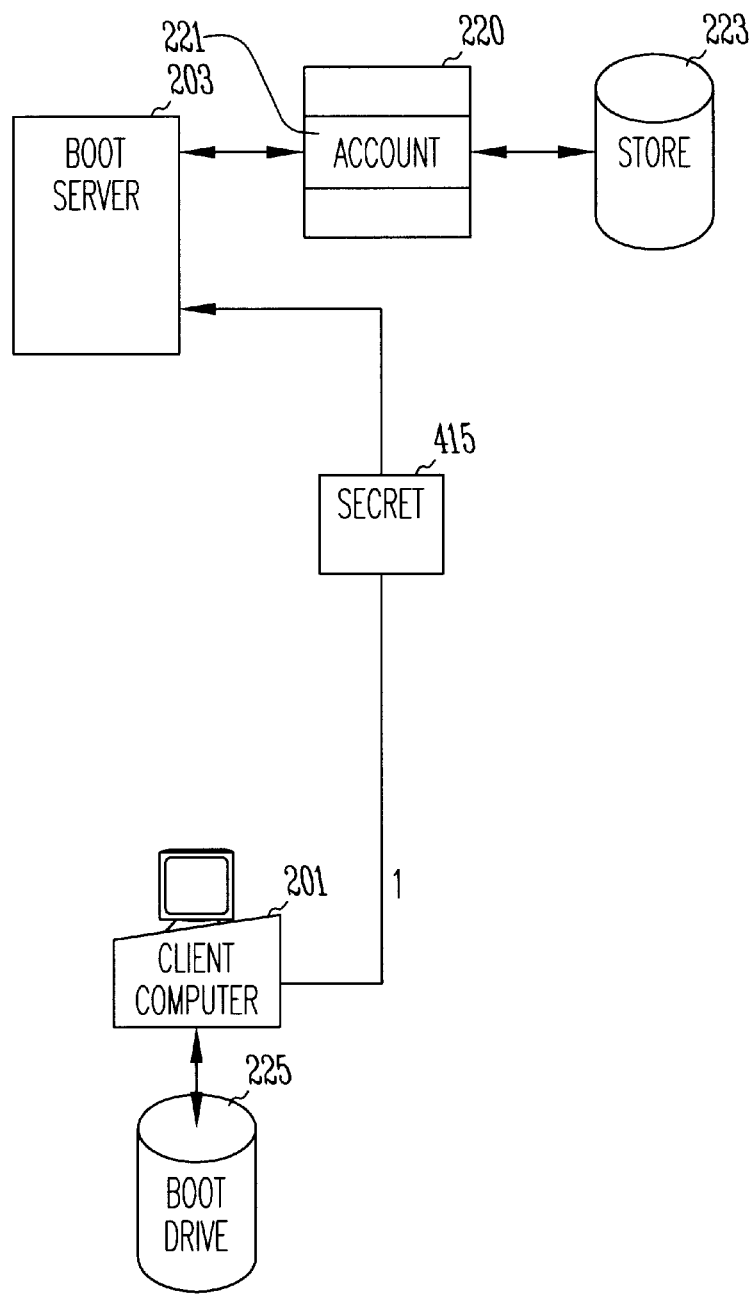

Now that the basic transactions of the remote boot process have been described, alternate embodiments which handle changes in the operating environment of the client computer 201 are next discussed in conjunction with FIGS. 3 and 4.

FIG. 3 illustrates an exemplary embodiment that provides for the creation of a new secret if the boot drive 225 holding the secret 215 is no longer available. One of skill in the art will readily appreciate that the private key 231/public key 232 pair is interchangeable with the secret 215.

The drive can become unavailable because the data on the drive has been corrupted, the user has replaced the drive in the client computer 201, or multiple drives in the client computer 201 have been re-ordered so that the drive holding the secret 215 is no longer the boot drive. Regardless of the circumstances, a new secret must be generated to permit the client computer to remotely boot.

In this embodiment, hard disk serial numbers assigned and stored on drives by the manufacturer is used to determine when the boot drive has changed. As part of the initial setup of the client computer 201, the serial number 224 of the boot drive 225 is passed to the boot server 203 by the BIOS firmware as shown in phantom in transaction 1 of FIG. 2A. The serial number is stored by the boot server 203 in the client-specific store 223.

Turning now to FIG. 3, on subsequent boots in one embodiment, the BIOS firmware sends the serial number 226 of a new boot drive 325 to the boot server 203 along with the loader request 209 (transaction 1). The boot server 203 compares the serial number sent by the client computer 201 with the stored serial number. Because the serial numbers do not match, the boot server 203 recognizes that the boot disk 225 is no longer available. Therefore, the boot server 203 saves the new serial number and downloads the initialization loader 211 instead of the OS loader (transaction 2).

The initialization loader 211 asks the user to submit credentials 213 as described above in conjunction with FIG. 2A. The initialization loader 211 presents the user credentials 213 to the boot server 203 (transaction 3). The boot server 203 then creates a new password for the machine account for client computer 201, encrypts the new password using the one-way encryption algorithm and machine account name to create a new secret 315, seals the secret 315 with the user credentials 213, and transfers the sealed new secret 315 to the client computer 201 (transaction 4). The initialization loader 211 stores the new secret 315 in the secure portion of the new boot drive 325. The boot server 203 downloads the OS loader 213 in response to the request from the client computer 201 and the OS loader 213 picks up the boot process at transaction 7 in FIG. 2A.

In an alternate embodiment not shown, on subsequent boots, the OS loader 213 requests the stored serial number and determines that the serial number on the boot drive 325 is different. Therefore, the OS loader 213 requests the download of the initialization loader in transaction 1. In this embodiment, the messages 224 and 226 shown in phantom in FIGS. 2A, 2B and 3 are unnecessary but a pair of messages (not shown) is used to request and download the stored serial number from the boot server 203.

When the boot disk is unchanged but the secret 215 has become corrupted, the security service on the boot server 203 will be unable to authenticate the file transfer login requested by the OS loader 213 (transaction 7 in FIG. 2A). Therefore, the boot server 203 downloads the initialization loader 212 so that a new secret can be generated as shown in FIG. 3.

As described further above, a clear-text version of the password may be necessary for portions of the operating system on the client computer 201. In an alternate embodiment of transaction 4 shown in phantom in FIG. 3, the boot server 203 also sends down the clear-text version 316 of the new machine account password for use by the local security module.

On the other hand, an operating system component on the client computer 201 can change the machine account password without changing the boot drive. Such a case is illustrated by FIG. 4. The local security service on the client computer 201 and the security service on the boot server 203 cooperate to create a new secret 415 (transaction 1). The new secret 415 is also stored on the secure portion of the boot drive 225.

The above embodiments which generate a new secret can also be practiced in conjunction with a secret generated by the client computer 201 as described further above as will be immediately perceived by one skilled in the art.

Post-boot Processes

Figure 5:
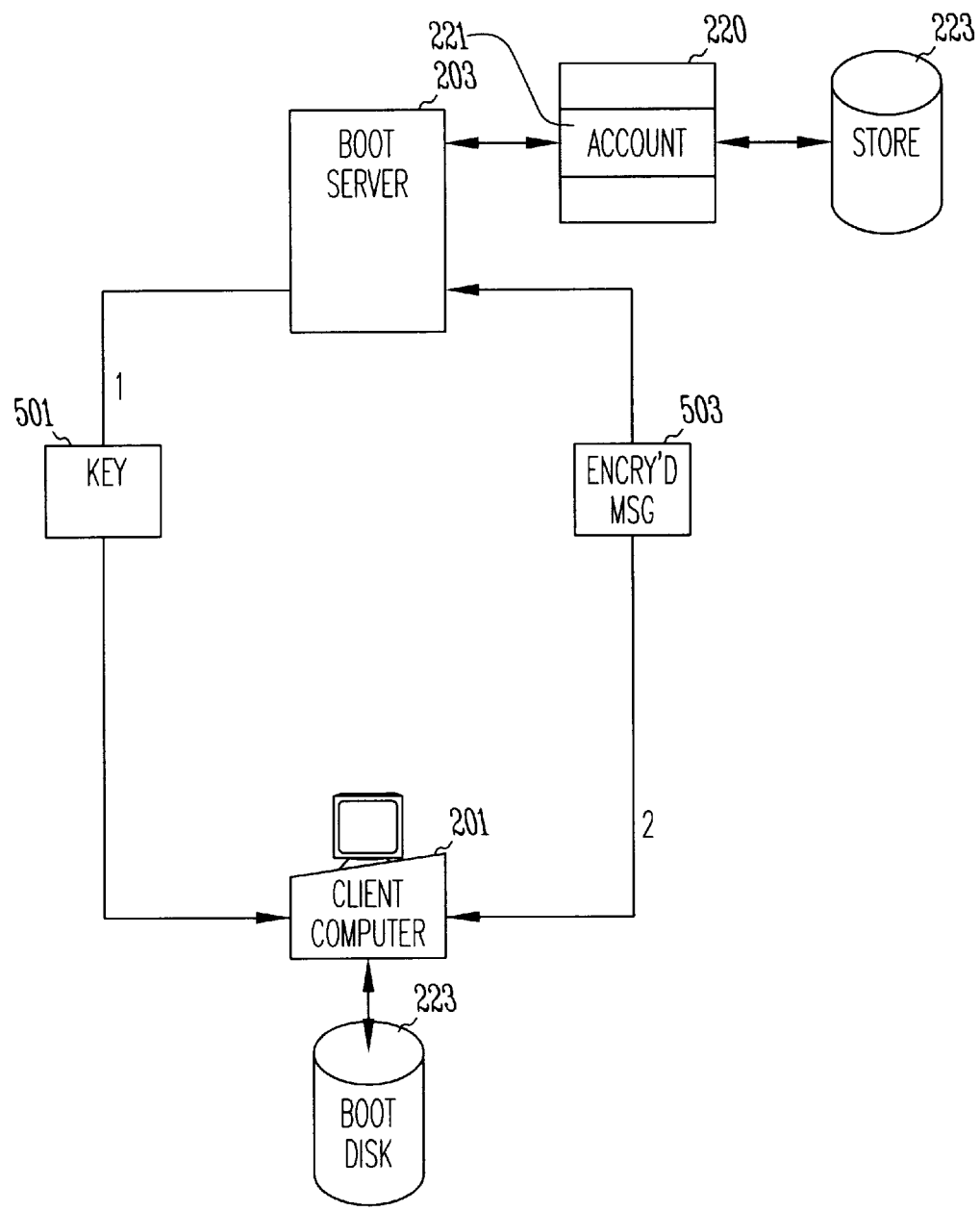
FIG. 5 is a diagram illustrating additional features of the exemplary embodiment of the invention shown in FIG. 2.

Providing signing and sealing during the boot process using a secret shared between the client and boot server or a private/public key pair also provides security benefits to post-boot processes as illustrated in FIGS. 5 and 6.

For example, an encryption key used with a secured transport protocol can be securely exchanged between the client computer 201 and the boot server 203 to secure the download of the additional files required to make the client computer 201 fully operational. In the embodiment shown in FIG. 5, once all the boot files 219 have been downloaded to the client computer 201, the boot server 203 generates an key 501 and transfers it to the client computer 201 inside a sealed message (transaction 1). The boot server 203 passes the key 501 to the server version of the secured transport service in preparation for an secured conversation with the client computer 201. The loader on the client computer 201 (either the setup loader or the OS loader) passes the key 501 to the operating system kernel which in turn passes the key 501 to the client version of the secured transport service. Now the client computer 201 and the boot server 203 can encrypt information using the key 501 and transfer the encrypted information 503 to the other computer (transaction 2).

Providing a secret or a private/public key pair also enables the boot server 203 to secure files on the server from access by unauthorized users. In an exemplary embodiment shown in FIG. 6, access to a file on the boot server 203 is controlled through an access control list (ACL) data structure 600 which contains an access control entry (ACE) 603 for each account allowed to access the file. The boot server 203 creates and maintains the association between each file stored on the server and its corresponding ACL.

Each ACE 603 defines the access rights for the corresponding account. When a file, such as a boot file, is created on the boot server 203 in the client-specific store 223, the boot server creates a least one special ACE 605 in the file's ACL that give full access rights to the machine account for the client computer 201. Therefore, if the operating system on the client computer 201 logs into the boot server 203 under the machine account, the ACE 605 allows full access to all the files in the client-specific store 223.

To sign on using the machine account in the exemplary embodiment, the client computer 201 first sends a negotiate message signed using the secret, or the client's private key, to the boot server 203 which sends back a challenge message sealed with secret, or the client's public key. The client computer 201 unseals the challenge message, extracts a unique challenge identifier, and sends the challenge identifier back to the boot server 203 in a messaged signed using the secret or the client's private key. Because only the client computer 201 could unseal the challenge message using the secret or the client private key, the client computer 201 is authenticated and allowed to log in under the machine account.

The secure logon process is managed by the security services running on the client and boot server. As such, any client-server security service which can verify that a client is valid without requiring the transmission of the secret (or private key) in clear-text across the network is applicable in the present invention.

The boot server 203 can also create special ACEs for trusted accounts. ACE 606 gives administrators on the boot server 203 full access to the client-specific store while special ACE 607 gives system processes executing locally on the boot server 203, such as the file transfer service, full access to the client-specific store. A fourth special ACE 608 denies all access to everyone. The special ACEs 605–608 are referred to herein as "privacy" ACEs. The privacy ACEs can appear in various combinations with the stipulation that the ACE 605 is always present. Other accounts logged into the boot server 203, including any user account on the client computer 201, are prevented from accessing the file by the ACL 600.

If an application running on the client computer 201 stores a file on the boot server 203 with an ACL data structure 601 created by the application, the boot server 203 adds the Privacy ACE 605 and privacy ACE 608 to the ACL 601 ahead of ACEs 609 which are specified by the application. As shown in FIG. 6, the privacy ACE 606 and privacy ACE 607, if required, are also added in ahead of the privacy ACE 608. When an application on the client computer 201 queries the permissions on a file, the privacy ACEs on ACL 601 are not returned so that it appears that only the ACEs 609 exist.

Because an ACL is processed from start to end, the ACE 608 denying all access to everyone prevents the boot server 203 from giving a user access to the file even if the ACEs 609 allow all access. Therefore, the operating system on the client computer 201 is responsible for enforcing the security imposed on the users by the ACEs 609.

In one embodiment, when a user requests access to a file on the boot server 203, the operating system on the client computer 201 logs into to the boot server 203 using the machine account as described above so that it has full access to the file as specified by ACE 605. The client operating system checks the ACEs 609 to determine if the user has the appropriate rights to the file associated with ACL 601. Thus, the operating system secures the files for each user having an account on the client computer 201 from access by the other users.

In an alternate embodiment, the ACL 601 without the privacy ACEs is cached on the client computer 201 and the access check is automatically run against the cached copy of the ACL 601 when the user requests access to the file.

Recovery

The embodiment of the secure remote boot process and post-boot processes described above provides for recovery from communication errors and failures when using a transport protocol, such as the well-known UDP (user datagram protocol), which does not guarantee the delivery of messages. The applicability of the recovery process of the present invention to different messaging protocols will be readily apparent to one skilled in the art. Such recovery as described below in reference to FIGS. 7A, 7B, 7C, 7D, 7E, 7F, 7G, 7H, and 7I is required when the invention is practiced with balanced signing and sealing as explained below but is not necessary in non-balanced systems.

Figure 7A:
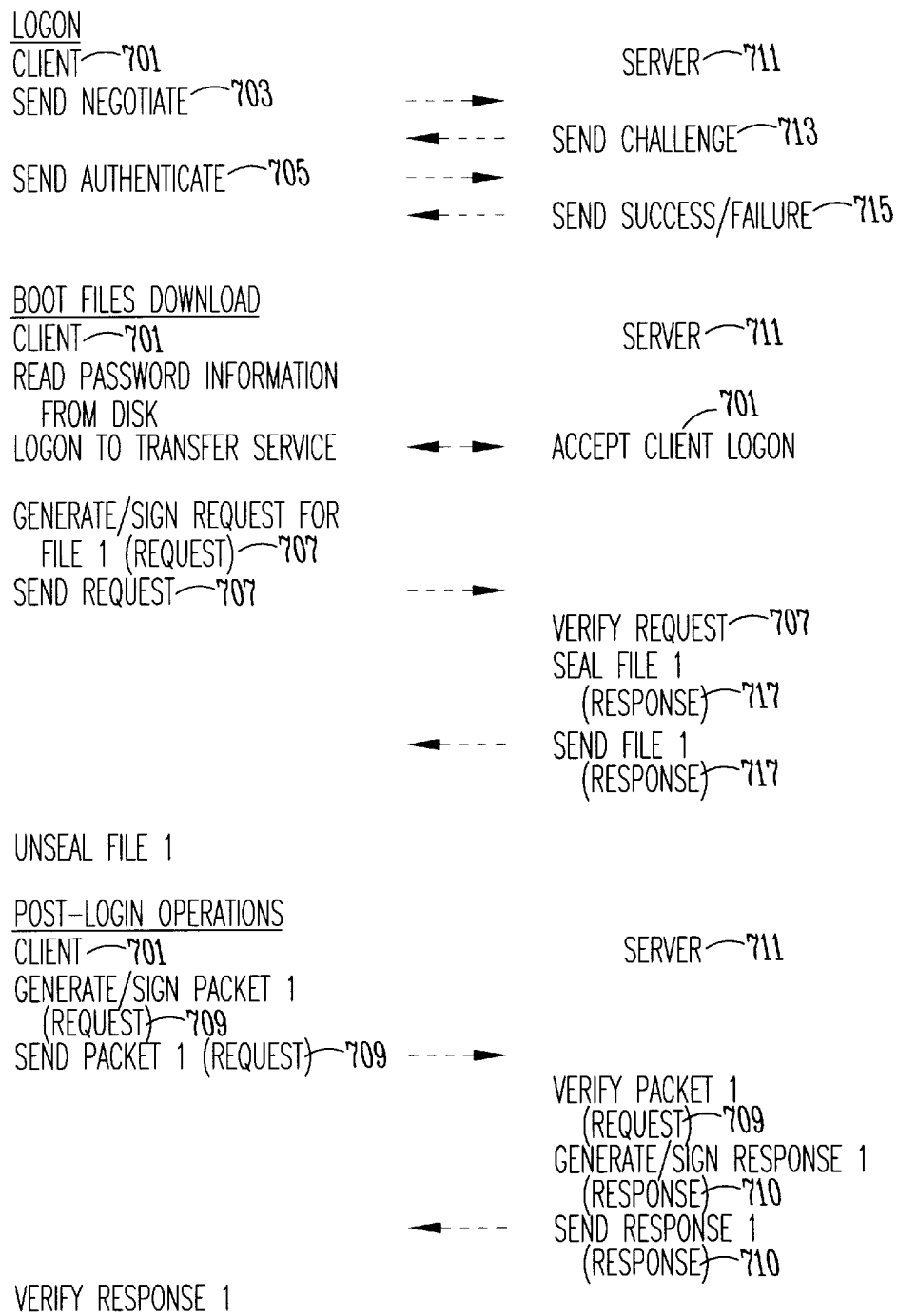
Figure 7B:
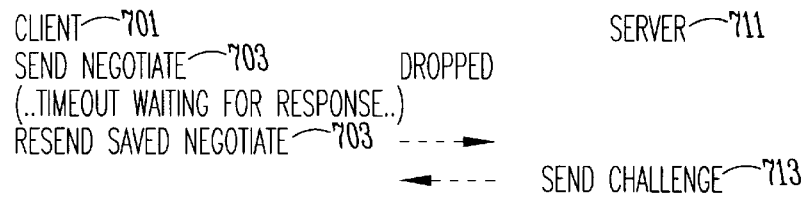
Figure 7C:
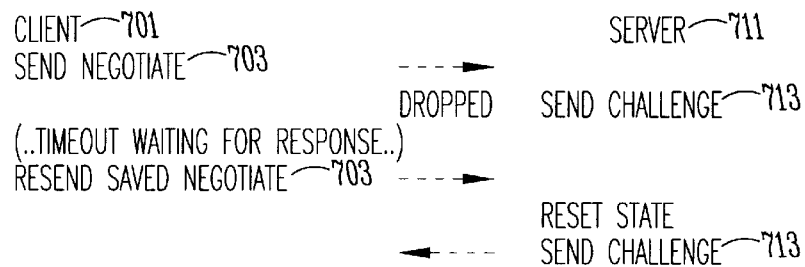
Figure 7D:
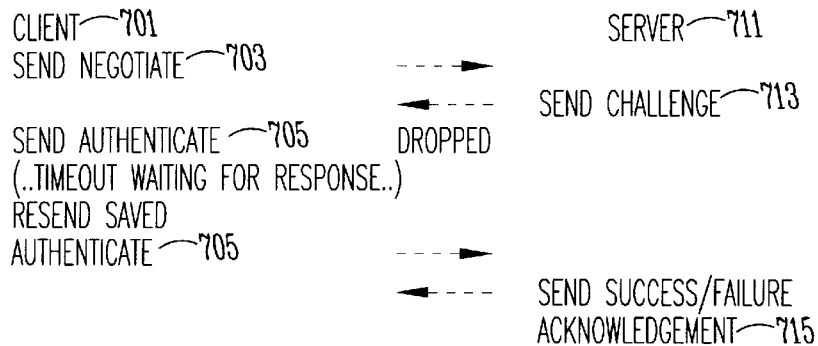

FIG. 7A illustrates an exemplary embodiment of normal message flow between the client computer 201 and the boot server 203 during the remote boot and post-boot conversations, while FIGS. 7B–I illustrate the corresponding recovery processes. The following description is broken into three parts. First, the secure logon process is described with reference to FIGS. 7A–E. Next, the secure boot file download process is described with reference to FIGS. 7A and 7F–G. Finally, the secure post-boot conversations are described with reference to FIGS. 7A and 7H–I.

Recovery is enabled by having the client computer 201 and the boot server 203 save the data bytes of each outgoing message immediately before the message is transmitted to the network. If a message is lost, the saved bytes are retransmitted. If the message were regenerated by the originating computer, the balancing rule imposed by the security service, i.e., that every sign/seal be matched by a verify/unseal, would be violated. Although the saving of messages as described below is not necessary for non-balanced signing/sealing operations, the increase in speed provided by the saved messages can benefit non-balanced systems.

The initialization, setup and OS loaders 211–213 log into the boot server 203 using a standard logon sequence shown in FIG. 7A. The loaders 211–213 each include a client version 701 of the security module and "talk" with applications on the boot server 203 which incorporate the server version 711 of the security module.

First, the client computer 201 obtains a signed "negotiate" message 703 from the client security service 701, saves the negotiate message 703, and sends it to the boot server 203. The boot server 203 passes the negotiate message 701 to the server security service 711 which returns a sealed "challenge" message 713. The boot server 203 saves the challenge message 713 and sends it to the client computer 201. The client computer 201 passes the challenge message 713 to the client security service 701 which returns a signed "authenticate" message 705 containing a unique challenge identifier that was part of the sealed challenge. The client computer 201 saves the authenticate message 705 and sends to the boot server 203. When the boot server 203 receives the signed authenticate message 705, it passes it to the server security service 711, which succeeds or fails the logon. A logon acknowledgement message 715 is sent by the boot server 203 to the client computer 201 to inform it of the success or failure of the logon.

Figure 7E:
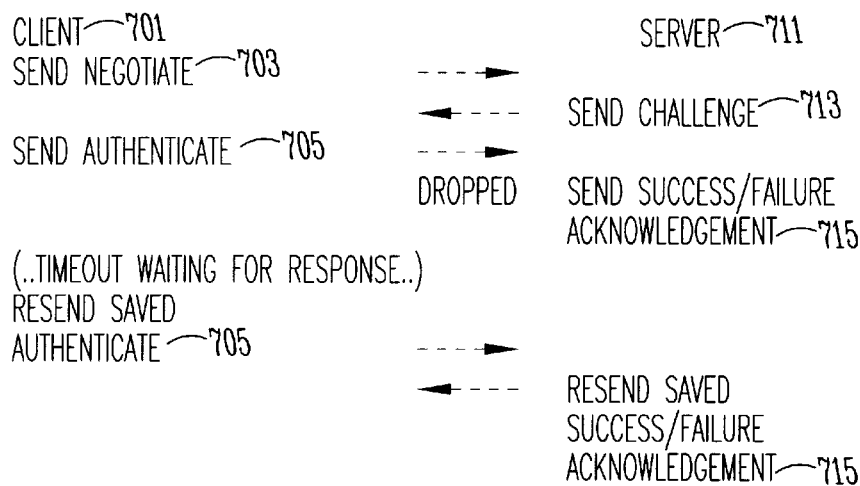

During the logon process, the client computer 201 always resends a message as shown in FIGS. 7B–E when it does not receive a return message. The boot server 203 only resends logon acknowledgement messages 715 as shown in FIG. 7E. Because the challenge identifier is unique, the boot server 203 must save the acknowledgement message 715 or the logon process will violate the balance rule and fail. Furthermore, a key based in whole or in part on challenge identifier is mutated in an identical fashion by both the boot server 203 and the client computer 201, and is included as part of each message sent between them so that once the logon process is complete, messages must be saved instead of being regenerated to preserve the mutation sequence and the balance rule.

Figure 7F:
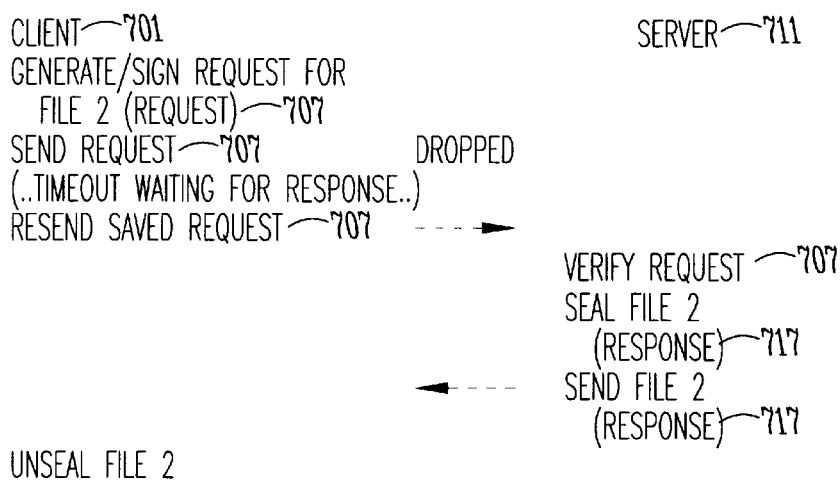
Figure 7G:
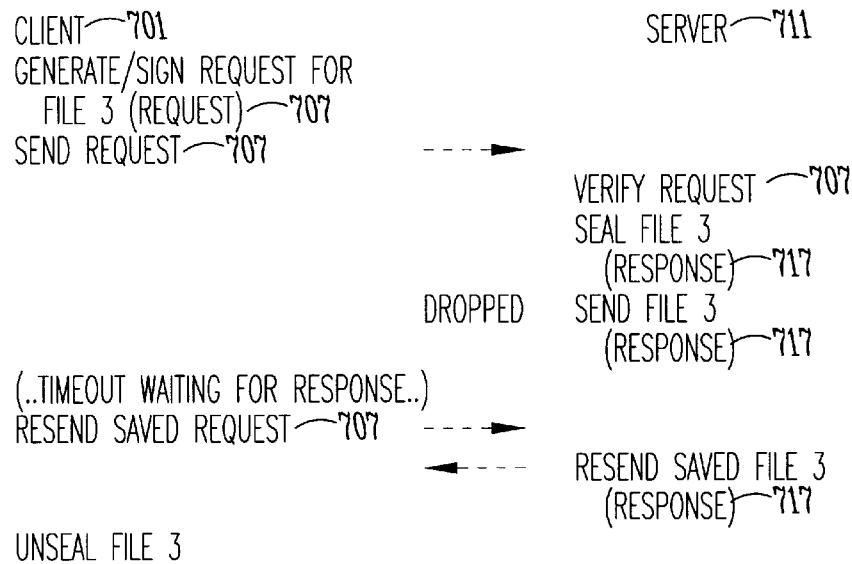

When the client computer 201 successfully logs onto the boot server 203, the boot server downloads the boot files in response to client requests as shown in FIG. 7A. If a client request 707 is dropped, the client computer 201 resends the request 707 as illustrated by FIG. 7F. If the message 717 containing the boot files is not received as shown in FIG. 7G, the client computer 201 resends the request 707 and the boot server 203 resends the message 717.

Figure 7H:
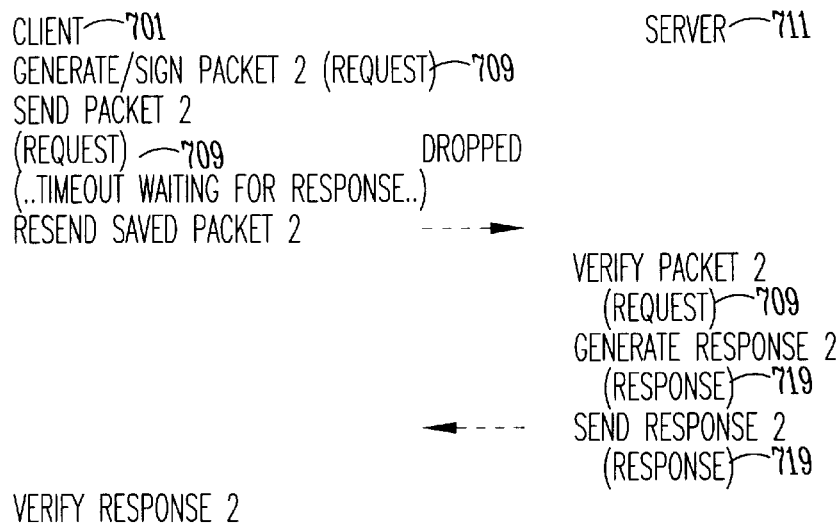
Figure 71:
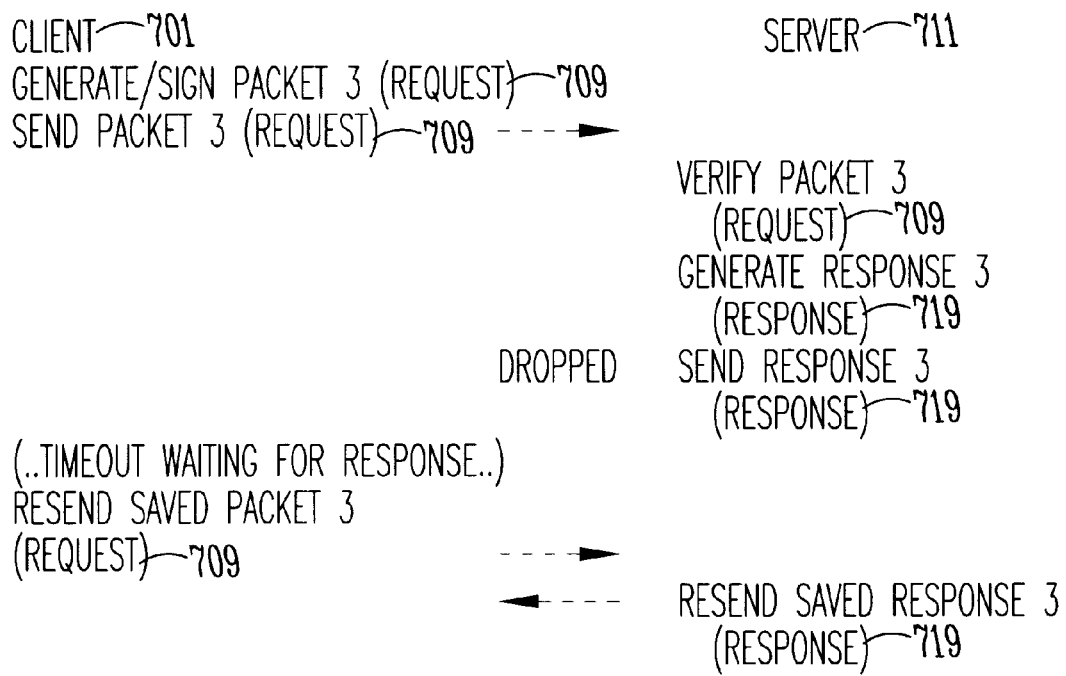

Once the boot process is completed, the two sides can sign/seal data sent between them as shown by request message 709 and response message in 719 in FIG. 7A but only the client re-sends messages as illustrated in FIGS. 7H and 7I.

The system level overview of the operation of an exemplary embodiment of the invention has been described in this section of the detailed description. The secure remote boot process shares a secret between the remote boot client computer and the boot server to ensure the integrity of remote booting across a network. The secret is also used to control user access to files and to secure the exchange of key for encrypted conversations between the client and server. Alternatively, a private/public key pair is used in place of the secret. While the invention is not limited to any particular embodiment, for sake of clarity, simplified initial and subsequent boot processes have been described.

Methods of an Exemplary Embodiment of the Invention

In the previous section, a system level overview of the operation of exemplary embodiments of the invention was described. In this section, the particular methods performed by the server and the clients of some of exemplary embodiments are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the client executing the instructions from computer-readable media). Similarly, the methods to be performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media). While not all the embodiments described in the previous section are represented by flowcharts, one of skill in the art will readily appreciate how the flowcharts described below can be modified to add the other embodiments. Furthermore, one of skill in the art will easily be able to extrapolate the following description to systems which do not require balancing the signing and sealing operations. As described in the previous section, a private/public key pair for the client can be substituted for the secret specified below.

Figure 8:
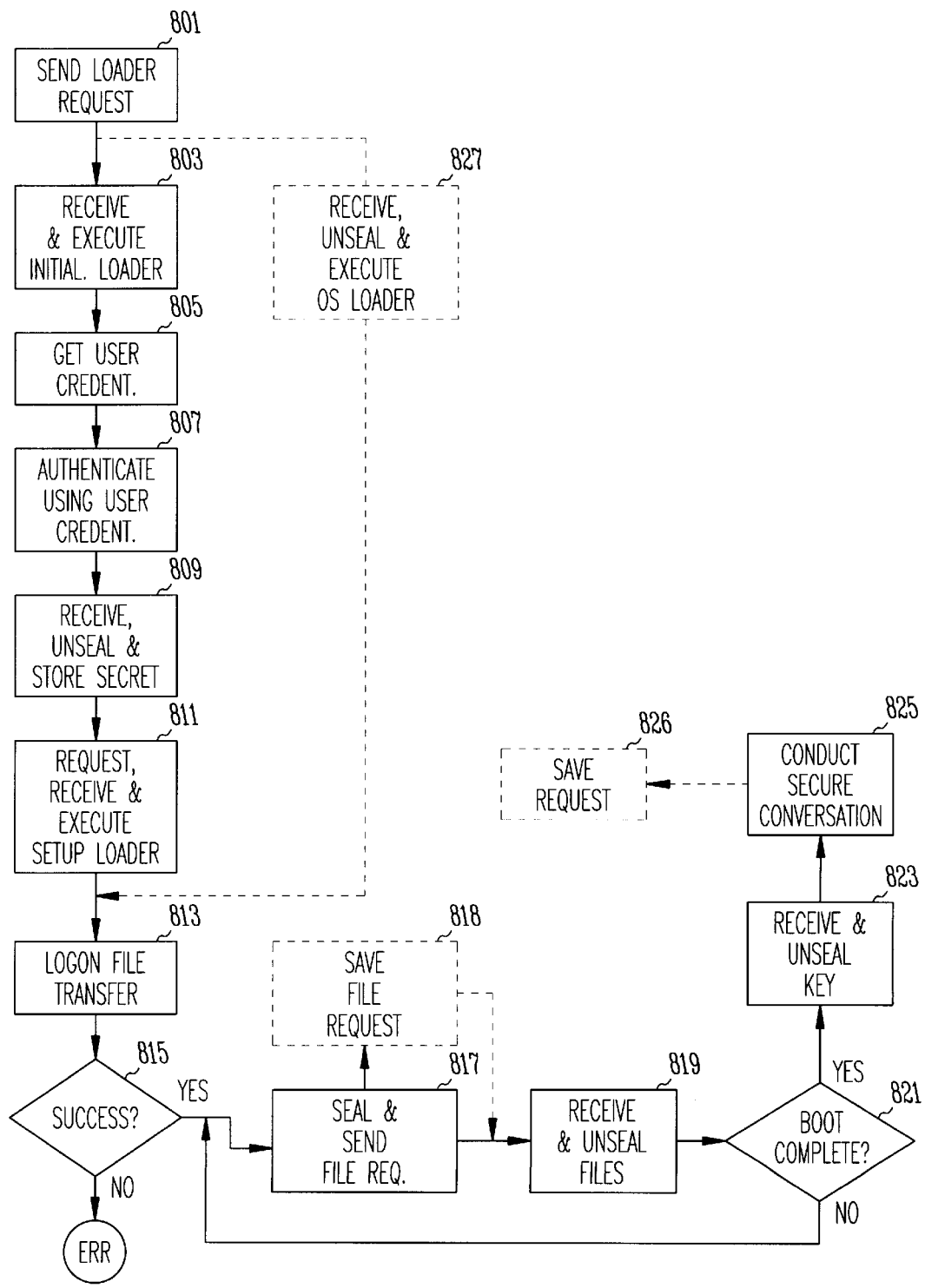
FIG. 8 is a flowchart of a method to be performed by a client according to an exemplary embodiment of the invention.

Referring first to FIG. 8, a flowchart of a method to be performed by a client according to an exemplary embodiment of the invention is shown. This method is inclusive of the steps or acts required to be taken by the processor of a client computer such as computer 20 in FIG. 1, to remotely boot the client for a network server.

The client sends a request for a loader application to the server (step 801). The client receives and executes a loader application (step 803). If this is the initial setup of the client, the loader application received executed at step 803 is an initialization loader application and the steps 807 through 811 are performed on the initial boot. On subsequent boots, the client receives, unseals, and executes an OS loader application as shown in phantom step 827 and skips steps 807 through 811.

On initial setup, the client requests credentials from the user (step 805) which it presents to authenticate itself to the server (step 807). The client receives a sealed message containing a secret, unseals the message using the user credentials, and stores the secret (step 809). The client also requests, receives and executes a setup loader application (step 811).

The client logs into a file transfer service on the server using the machine account name and secret (step 813). The client receives a login acknowledgement message (step 815). If the login was successful, the client sends a signed message requesting that the boot files be downloaded (step 817). The client receives, unseals, and processes the boot files (step 819). The client continues to request and process boot files until the boot process is complete (step 821).

Once the boot process is complete at step 821, the client receives and unseals a message containing an encryption key needed to conduct secure post-boot conversations with the server (step 823). The client conducts such a secure conversation at step 825 by sealing each message (request) sent to the server and unsealing each response received from the server.

In order to provide recovery in case of undelivered messages, the client can optionally save its requests, as shown in phantom at steps 818 and 826, and retransmit them if it does not receive the corresponding responses as described in the previous section.

Figure 9:
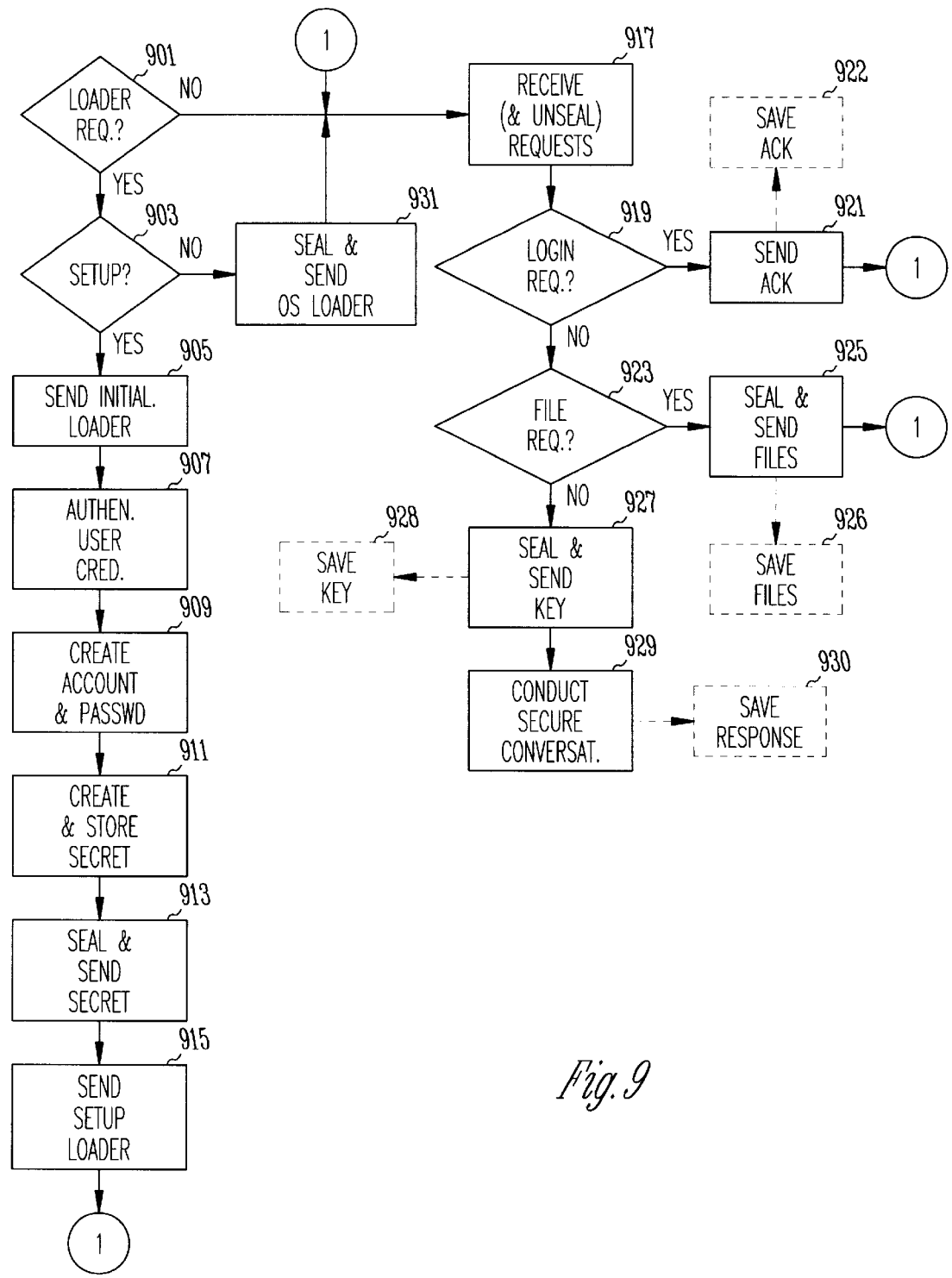
FIG. 9 is a flowchart of a method to be performed by a server according to an exemplary embodiment of the invention.

Turning now to FIG. 9, a flowchart of a method to be performed by a server according to an exemplary embodiment of the invention is shown. This method is inclusive of the steps or acts required to be taken by the processor of a server computer such as computer 49 in FIG. 1, to remotely boot a network client.

The server receives and processes a loader request from the client (step 901). If this is the initial setup of the client (step 903), the server downloads the initialization loader application to the client (step 905) and performs the steps 905 through 915. On subsequent boots of the client, the server downloads the OS loader application (step 924) and skips steps 905 through 915.

On the initial setup, the server authenticates the user credentials (step 907) and creates a machine account and a password for the client (step 909). The server encrypts the password to create a secret and stores the secret (step 911). The server seals the secret using the user credentials and downloads the sealed secret to the client (step 913). The server also sends the setup loader application (step 915). As described in the previous section, alternate embodiments in which the secret includes information in addition to the encrypted password and in which the client generates the secret are contemplated as within the scope of the present invention.

When the server receives a request from the client, it unseals it if it is sealed (step 917). If the request is to log into the file transfer service (step 919), the login request is processed by the server's security services and the appropriate acknowledgement returned to the client (step 921). If the request is for boot files (step 923), the server creates a sealed message containing the requested boot files and downloads the sealed message to the client (step 925).

Once the boot process is completed, the server seals and sends the encryption key necessary for secured post-boot conversations (step 927). The server decrypts each post-boot request from the client using the key and encrypts each of its responses before sending it to the client to conduct such secured conversations (step 929).

In order to provide recovery in case of dropped messages, the server can save its responses, as shown by steps 922, 926, 928, and 930 in phantom, so it can re-send the original message if necessary as described in the previous section.

Figure 10:
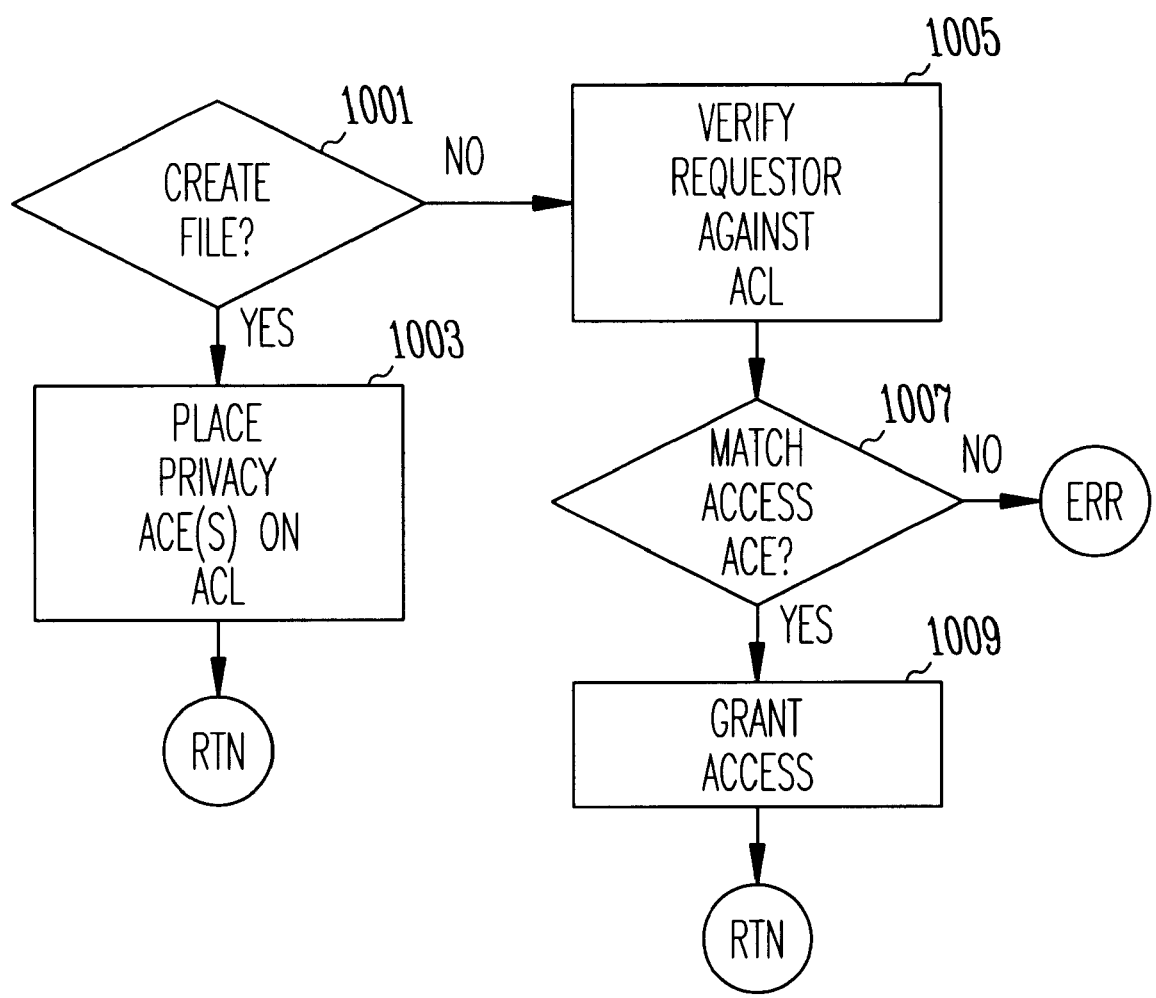
FIG. 10 is a flowchart of a method to be performed by a server according to an alternate embodiment of the invention.
Figure 11:
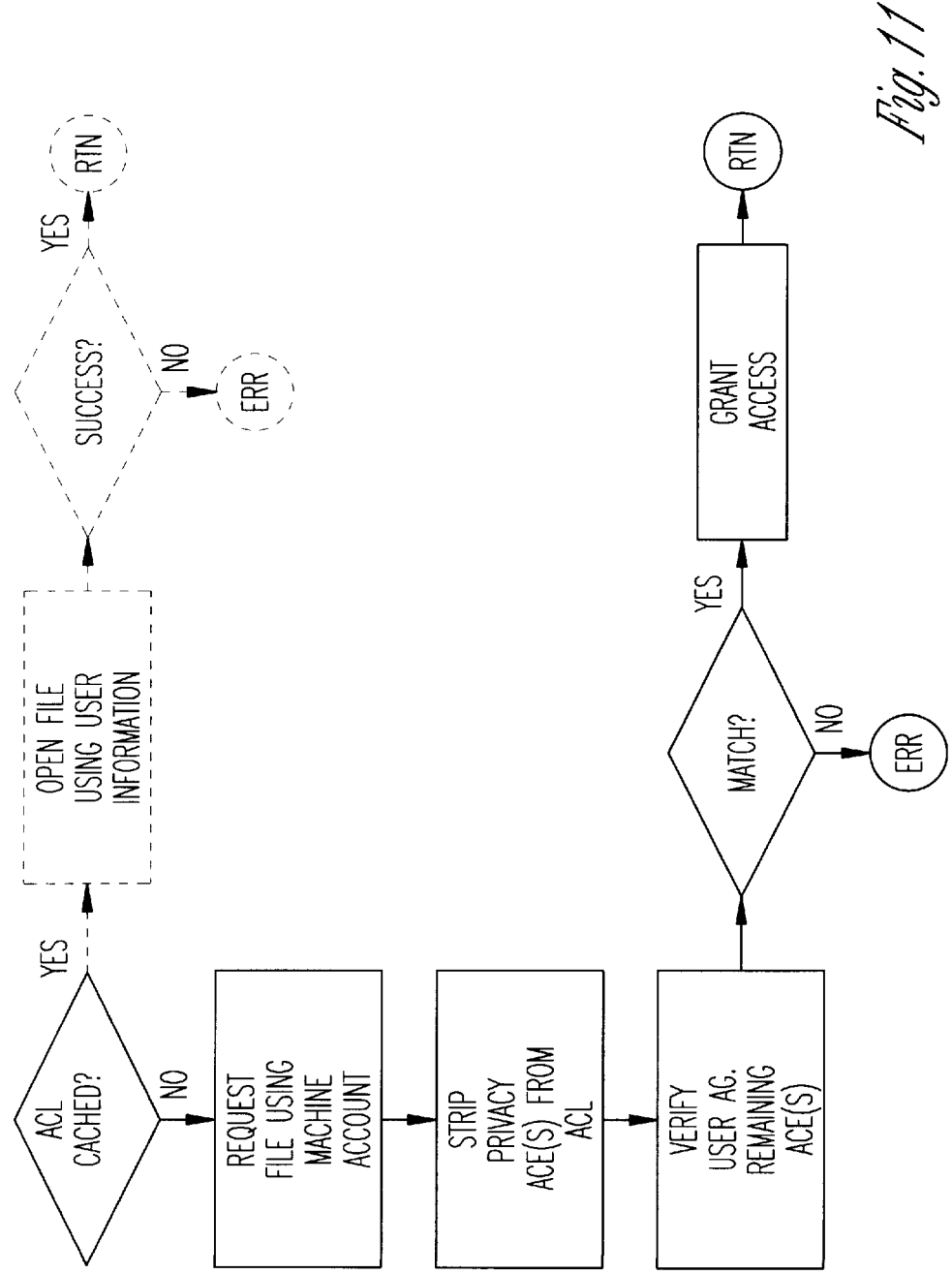
FIG. 11 is a flowchart of a method to be performed by a client according to an alternate embodiment of the invention.

In an alternate embodiment, the client and server also perform methods that employ the secret to prevent unauthorized users from accessing files on the server as illustrated in the flowcharts in FIGS. 10 and 11.

For each file to be stored on the server on behalf of the client (step 1001 in FIG. 10), the server places at least the privacy ACE 605 on the file's ACL and the other privacy ACEs 606–608 as required (step 1003). When the server receives a file request, it verifies the requestor against the ACL (step 1005) and, if the requestor matches a privacy ACE 605, 606 or 607 that permits access (step 1007), it grants access to the file (step 1009).

When a user on the client requests access to a file stored on the server (step 1101 in FIG. 11), the client sends an open request to the server using the machine account (step 1103). The client strips the privacy ACEs from the ACL (step 1105) and verifies the user against the remaining ACEs (step 1107).

In an alternate embodiment shown in phantom, the client checks its cache for a cached version of the ACL (step 1101). Because the cached version does not have the privacy ACEs, the client attempts to open the file as the user (step 1109). If the user has the proper access, the client is able to open the file while impersonating the user (step 1115).

The particular methods performed by client and servers of exemplary embodiments of the invention have been described. The methods performed by the client have been shown by reference to two flowchart including all the steps from 901 until 930, and the steps from 1101 until 1115. The methods performed by the server have been shown by reference to two flowcharts including all steps from 801 until 826, and the steps from 1001 until 1009.

Windows NT 5.0 Implementation

Figure 12:
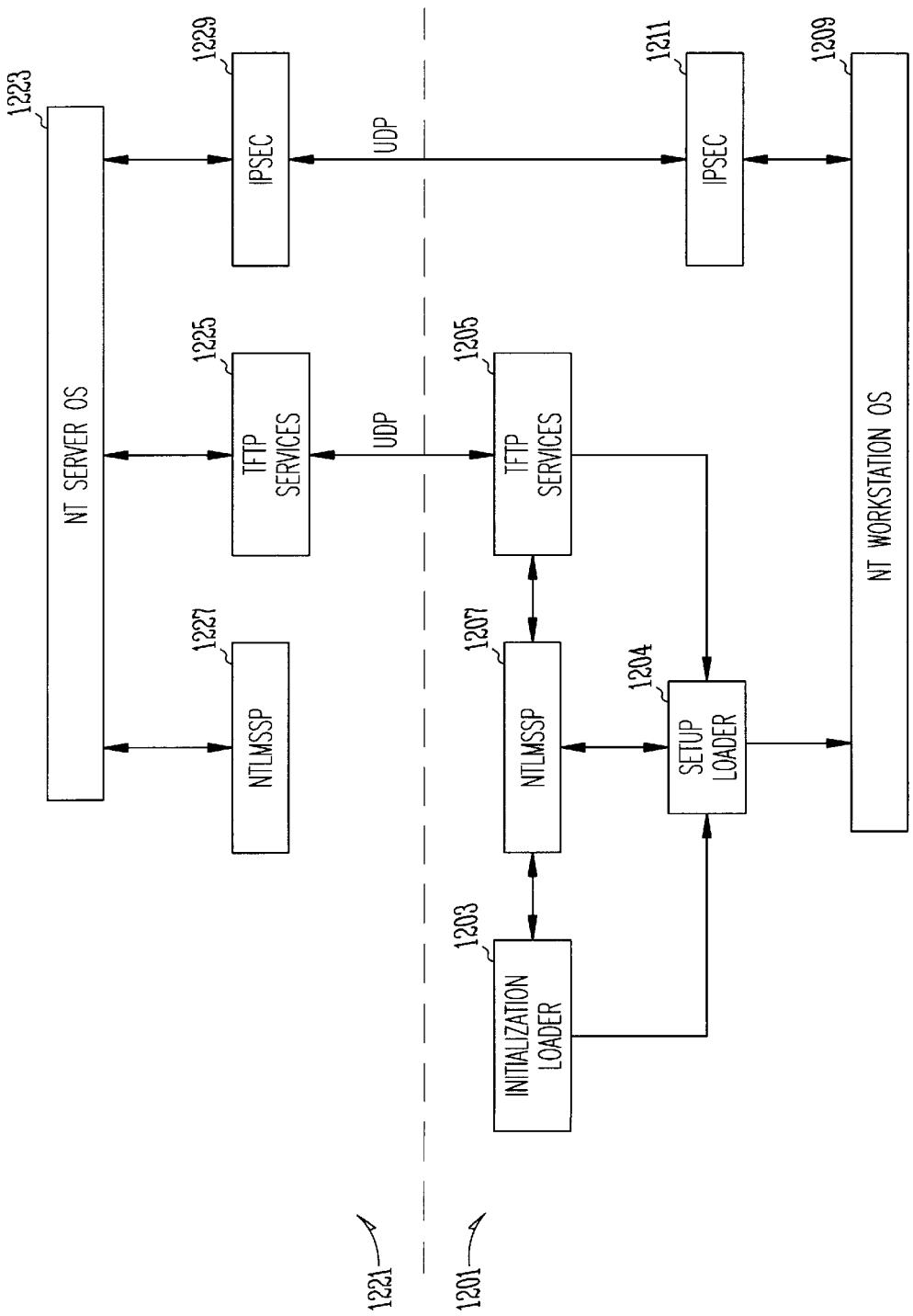
FIG. 12 is a diagram of code modules for use in an particular implementation of the invention.

In this section of the detailed description, a particular implementation of the invention in the Microsoft Windows NT 5.0 operating environment is described with reference to FIG. 12. FIG. 12 illustrates one embodiment of a combination of software modules executing in the processor of a client 1201 and a server 1221. As in the previous sections, the use of a private/public key pair for the client instead of the secret is contemplated as within the scope of the invention.

The server 1221 is under the control of the Windows NT 5.0 server operating system 1223. The server operating system 1223 is responsible for downloading the loaders to the client 1201. The server operating system 1223 also creates the machine account and password for the client 1201, encrypts the password to create the secret, and downloads the sealed secret to the client 1201. The password for this embodiment is 28 bytes long. The server operating system 1223 manages the directory service structure and the client-specific store.

The server utilizes the security services of the NT LAN security library (NTLMSSP) 1227 to manage the client logons, sign and/or seal messages to the client, and verify and/or unseal messages from the client. NTLMSSP 1227 uses the well-known RC4 algorithm for signing and sealing, and requires that the two sides balance every sign with a corresponding verify, and every seal with a corresponding unseal. In this embodiment, a digital signature generated by NTLMSSP 1227 is a 16 byte data structure containing a 32-bit checksum (4 bytes) and 12 bytes of additional information including sequence, version, and confounder. In an alternate embodiment not shown, NTLMSSP 1227 is replaced by a Kerberos security module.

The server 1221 relies on TFTP (trivial file transfer protocol) services 1225 to transfer boot files to the client over a UDP (user datagram protocol) network connection. The standard TFTP services are modified to interface with NTLMSSP. When requested, the TFTP 1225 prepends a digital signature provided by NTLMSSP 1227 to the beginning of a message before sending.

The server 1221 utilizes an ipsec module 1229, which is a secured version of the standard internet protocol, to secure post-boot conversations between the server 1221 and the client 1201. ipsec 1229 encrypts and decrypts messages to enable a secure conversation between the two ends of the connection. UDP is also used as the transport protocol for the post-boot conversations.

The client 1201 utilizes client versions of NTLLMSSP 1207, TFTP services 1205, and ipsec 1211 to sign and/or seal requests and messages sent to the server 1203. Additionally, the client 1201 relies on the initialization loader 1203 and setup loader 1204 which it downloads from the server 1201 during the initial remote boot setup. The initialization loader 1203 is responsible for storing the secret in a secure location on the client's boot disk. In the present embodiment, the secret is stored on sector three of the drive. The location is available to the loaders because the loaders access the drive at the BIOS level but it is secured from modification by higher levels of software. Optionally, non-administrator users can be prevented from viewing the raw sector.

On subsequent boots, the initialization loader 1203 is not present and the setup loader 1204 is replaced by the OS loader (not shown). Both the setup loader 1204 and the OS loader rely on the client side NTLMSSP module 1207 operating in conjunction with the TFTP services 1205 to log onto the TFTP services 1225 on the server 1221, to sign and/or seal requests/messages to the server 1221, and to verify and/or unseal responses/messages from the server 1221.

The client 1201 is under the control of the loaders until the NT 5.0 workstation operating system kernel 1209 is downloaded from the server 1221 and control is passed from the setup/OS loader to the kernel 1209. The operating system 1209 is responsible for securing post-boot conversations with the server 1221 through ipsec 1211 to download the remainder of the operating system necessary to make the client 1201 fully operational.

Because UDP does not guarantee message delivery, the various modules of the client 1201 and the server 1221 which converse over the UDP connection are responsible for message recover. The following rules are used by the setup loader 1204 (and OS loader) and the TFTP module 1225 handle undelivered messages during the TFTP logon process.

1. The client 1201 saves all outgoing messages and resends them if it does not get a response.

2. The server 1221 saves the logon acknowledgement messages it uses to response to authenticate messages.

3. If the server 1221 gets a negotiate message before the logon process is complete, it assumes the client has started over, frees any saved messages, and sends a new challenge message.

4. If the server 1221 gets an authenticate message when it has saved a logon acknowledgement message, it resends the logon acknowledgement message.

5. If the server 1221 gets an authenticate message when it has not yet received a negotiate message, it returns an error to the client 1201.

6. If the client 1201 gets an error, it starts the logon process over with a new negotiate message.

For messages dropped during file download, the setup/OS loader and the TFTP module 1225 use the following rules.

1. The server 1221 does not attempt to determine if a packet it sent was dropped, relying on the client 1201.

2. If the client 1201 gets no response from the server, it assumes that either its request or the server's response was dropped, and resends the request.

3. Since the client 1201 and server 1221 are signing and/or sealing their messages and NTLMSSP is a balanced protocol, the appropriate modules on each side save their messages and use the saved messages to recover from a communications error. Each message has a sequence number in it, which is not part of the signed/sealed data.

When the server 1221 sends a response, it saves the response and the associated sequence number. If the server 1221 gets a new request, it checks if the sequence number is the same as the last response. If so, it replies with the saved message. It does this check before verifying/unsealing the request from the client 1201.

The embodiments of the secure remote boot process described in this and previous sections are predicated on always booting the client 1201 remotely. However, the following alternate embodiments are also contemplated as within the scope of the NT 5.0 implementation in particular and the invention in general.

Because files are cached in the cache memory of client 1201, after some period of time the client computer contains a copy of all the boot files including the OS loader and the operating system kernel. Once this point is reached, the client computer boots itself locally. The network continues to be at the top of the boot order in such an embodiment, but the server check the client cache before downloading the loader. If all the required files exist in the cache, the server instructs the BIOS to boot from the cache. In one alternate embodiment, if some or all of the files no longer reside in the cache, the server proceeds with the remote boot but only downloads those files which are missing from the cache.

The cached files can also be used to complete a remote boot process when the connection to the server is broken. Under such circumstances, the client 1201 sets information in its NT registry to notify ipsec 1211 that when it reconnects to the server, it should set up an encrypted session. This is known as setting a policy in the registry since the server is unaware that the client has booted and will not have downloaded the ipsec key.

When ipsec 1211 starts, its policy manager checks the registry to see what policies are in force. Under normal circumstances, a policy is set by a user on a previous boot, but in this case the registry has been initialized directly. When the client 1201 next boots remotely, it clears this information out of the registry since the server 1221 has already sent the ipsec key.

Instead of waiting for all the files to be cached, the boot files and OS loader can be installed on the local boot drive of the remote boot client just as they are on a normal client. In one alternate embodiment which uses this scenario, the decision to boot either remotely or locally is based on criteria set up by the user or the network administrator.

In a further alternate embodiment, the client computer only boots remotely on initial setup to install the required files and then always performs all subsequent boots from the local boot drive. In such an embodiment, the secret is held in memory during the initial setup but is not stored on the local boot drive since it is not used thereafter. Recreating and/or updating the secret is also unnecessary. Furthermore, because downloading the operating system files can be considered non-critical, the use of secured TFTP and ipsec is optional. If ipsec is used, the secured conversation with the server is only required for a short period during the setup so recovery from a lost connection to the server as described above is not implemented in this alternate embodiment. Finally, the handling of the privacy ACEs by the client as described in the previous section is also unnecessary since the server files are only read in specific situations in which client-based access checking is not performed.

The code modules required to implement an exemplary embodiment of the secure remote boot process in a Windows NT 5.0 environment have been described in this section. Alternate embodiments in which the client can boot either remotely or locally, and the procedures necessary to support the alternatives, have also been described. Furthermore, the rules used by the NT 5.0 client and server to recover from communication errors have been described.

Conclusion

A remote boot process that ensures the integrity of the data necessary to remotely boot a client computer using a secret used to sign and/or seal the data has been described. The secret is generated by a server computer and securely delivered to the client during the initial setup of the client. The secret contains a one-way encryption of the password for the client account on the server. Each side balances a signed message with a verify and a sealed message with an unseal. Subsequent transactions between the client and server are conducted using messages encrypted with a key generated by the server and securely delivered to the client in a message sealed using the secret. The secret can also be used in conjunction with an access data structure to prevent unauthorized users from accessing data stored on the server on behalf of the client or other users. Alternate embodiments in which the secret is replaced with a client private/public key pair have also been described.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to is meant to include all network operating system environments which provide for remotely boot client computers from a server computer. Therefore, it is manifestly intended that this invention be limited only by the following claims and equivalents thereof.

We claim:

1. A computerized method for ensuring the integrity of remote boot client data comprising:

obtaining, by a process executing on a client, credentials and presenting the credentials to a server;

authenticating, by a process executing on the server, the credentials, and generating a secret, sealing the secret with the credentials, and sending the sealed secret to the client;

receiving, by the client process, the sealed secret, and unsealing the secret, signing a file transfer request using the secret, and sending the signed file transfer request to the server;

receiving, by the server process, the signed file transfer request, and verifying the file transfer request using the secret, sealing the requested files using the secret, and sending the sealed files to the client;

receiving, by the client process, the sealed files;

unsealing the files using the secret; and using the files to boot the client.

2. The computerized method of claim 1, further comprising:

sending, by the server process, a sealed key to the client;

receiving, by the client process, the sealed key from the server, unsealing the key, sealing a request to the server with the key, and sending the sealed request to the server;

receiving, by the server process, the request sealed with the key, unsealing the request with the key, creating a response to fulfill the request, sealing the response with the key, and sending the sealed response to the client; and receiving, by the client process, the sealed response and unsealing the response with the key for further processing.

3. The computerized method of claim 1, further comprising:

securing, by the server process, a client file stored on the server with an access control list data structure and sending the access control list data structure to the client; and validating, by the client process, access requests for the file against the access control list data structure received from the server.

4. The computerized method of claim 1, further comprising:

saving, by the client process, an original signed request and resending the saved signed request when an expected response to the original signed request is not received; and saving, by the server process, an original sealed response sent in response to a first request and resending the saved sealed response when a second request duplicating the first request is received.

5. A computer-readable medium having computer-executable instructions stored thereon to cause a client computer to perform a method comprising:

presenting credentials to a server computer;

receiving a sealed secret in response;

unsealing the secret using the credentials;

signing a file request;

sending the signed file request to the server computer;

receiving sealed boot files in response;

unsealing the boot files using the secret; and completing a boot process using the unsealed boot files.

6. The computer-readable medium of claim 5, further comprising:

receiving a sealed key from the server;

unsealing the key;

sealing a request to the server with the key;

sending the sealed request to the server;

receiving a sealed response to the request; and unsealing the response with the key for further processing.

7. The computer-readable medium of claim 5, further comprising:
   validating access requests for a file stored on the server against an access data structure received from the server, wherein the access data structure is associated with the file to secure the file.

8. The computer-readable medium of claim 5, further comprising:
   saving an original signed request and resending the saved signed request when a response to the original sealed request is not received.

9. A computer-readable medium having computer-executable instructions stored thereon to a cause a server computer to perform a method comprising:
   authenticating credentials presented by a client computer;
   generating a secret in response;
   sealing the secret with the credentials;
   sending the sealed secret to the client computer;
   receiving a signed file request from the client computer;
   verifying the file request using the secret;
   sealing, using the secret, the files requested in the unsealed file request; and
   sending the sealed files to the client computer.

10. The computer-readable medium of claim 9, further comprising:
    sending a sealed key to the client; and
    receiving a request sealed with the key, unsealing the request with the key, creating a response to fulfill the request, sealing the response with the key, and sending the sealed response to the client.

11. The computer-readable medium of claim 9, further comprising:
    securing a client file stored on the server with an access data structure and sending the access data structure to the client.

12. The computer-readable medium of claim 9, further comprising:
    saving an original sealed response sent in response to a first request and resending the saved sealed response when a second request duplicating the first request is received.

13. A computerized system comprising:
    a plurality of loader modules downloaded from a server to a client;
    a secured file transfer service executing on the server and coupled to one of the plurality of loader modules, wherein the file transfer service is secured with a secret generated by the server and shared with the client; and
    a secure conversation coupling the client and the server, wherein the secure conversation comprises corresponding secured network protocol modules executing on the client and the server based on a key securely shared between the client and server using the secret.

14. The computerized system of claim 13, wherein the plurality of loaders comprises:
    an initialization loader for obtaining and presenting credentials to the server to authenticate the client and for receiving the secret from the server;
    a setup loader initially coupled to the secured file transport service for obtaining boot files sealed using the secret from the server, for unsealing the boot files and booting the computer, wherein the unsealed boot files are stored on the client; and
    an OS loader for booting the computer using the unsealed boot files stored on the client.

15. The computerized system of claim 13, wherein the plurality of loaders comprises:
    an initialization loader for obtaining and presenting credentials to the server to authenticate the client and for receiving the secret from the server;
    a setup loader initially coupled to the secured file transport service for obtaining boot files sealed using the secret from the server, for unsealing the boot files and booting the computer; and
    an OS loader subsequently coupled to the secured file transport service for obtaining the boot files sealed using the secret from the server, for unsealing the boot files and booting the computer.

16. A computer-readable medium having stored thereon a storage management data structure comprising:
    a first field containing data representing an association between a file stored on a server and an access control list data structure used to control access to the file, wherein the access control list data structure comprises a first access control entry; and
    a second field containing data representing the first access control entry, wherein the first access control entry is a privacy access control entry giving a client account full access to the file.

17. The computer-readable medium of claim 16, wherein the storage management data structure comprises a third field containing data representing a second access control entry in the access control list data structure and the second access control entry is selected from the group consisting of a privacy access control entry giving administrator accounts full access to the file, and a privacy access control entry giving processes executing on the server full access to the file.

18. The computer-readable medium of claim 16, wherein the storage management data structure comprises a third field containing data representing a second access control entry in the access control list data structure and the second access control entry is a privacy access control entry denying access to all accounts.

19. The computer-readable medium of claim 18, wherein the storage management data structure comprises a fourth field containing data representing a third access control entry in the access control list data structure and the third access control entry is a standard access control entry giving some access to an account.

20. A computerized method for ensuring the integrity of remote boot client data comprising:
    obtaining, by a process executing on a client, credentials and presenting the credentials to a server;
    authenticating, by a process executing on the server, the credentials, and generating a key pair, sealing the key pair with the credentials, and sending the sealed key pair to the client, wherein the key pair comprises a client public key and a client private key;
    receiving, by the client process, the sealed key pair, and unsealing the key pair, signing a file transfer request with the client private key, and sending the signed file transfer request to the server;
    receiving, by the server process, the signed file transfer request, and verifying the file transfer request using the client public key, sealing the requested files with the client public key, and sending the sealed files to the client; and
    receiving, by the client process, the sealed files, and, in unsealing the files using the client private key, and using the files to boot the client.

21. The computerized method of claim 20, further comprising:
sending, by the server process, a sealed key to the client;
receiving, by the client process, the sealed key from the server, unsealing the key, sealing a request to the server with the key, and sending the sealed request to the server;
receiving, by the server process, the request sealed with the key, unsealing the request with the key, creating a response to fulfill the request, sealing the response with the key, and sending the sealed response to the client; and
receiving, by the client process, the sealed response and unsealing the response with the key for further processing.

22. The computerized method of claim 20, further comprising:
securing, by the server process, a client file stored on the server with an access control list data structure and sending the access control list data structure to the client in response to a request authenticated with the client private key; and
validating, by the client process, access requests for the file against the access control list data structure received from the server.

23. The computerized method of claim 20, further comprising:
saving, by the client process, an original signed request and resending the saved signed request when an expected response to the original signed request is not received; and
saving, by the server process, an original sealed response sent in response to a first request and resending the saved sealed response when a second request duplicating the first request is received.

24. A method implemented by a client computer, the method comprising:
presenting credentials to a server computer;
receiving a sealed secret in response;
unsealing the secret using the credentials;
signing a file request;
sending the signed file request to the server computer;
receiving sealed boot files in response;
unsealing the boot files using the secret; and
completing a boot process using the unsealed boot files.

25. The method of claim 24, further comprising:
receiving a sealed key from the server;
unsealing the key;
sealing a request to the server with the key;
sending the sealed request to the server;
receiving a sealed response to the request; and
unsealing the response with the key for further processing.

26. The method of claim 24, further comprising:
validating access requests for a file stored on the server against an access data structure received from the server, wherein the access data structure is associated with the file to secure the file.

27. The method of claim 24, further comprising:
saving an original signed request and resending the saved signed request when a response to the original sealed request is not received.

* * * * *